United States Patent
Nguyen et al.

(10) Patent No.: US 10,538,697 B2
(45) Date of Patent: Jan. 21, 2020

(54) PROPPANT AGGREGATES FOR USE IN SUBTERRANEAN FORMATION OPERATIONS

(71) Applicant: Halliburton Energy Services, Inc., Houston, TX (US)

(72) Inventors: Philip D. Nguyen, Houston, TX (US); Walter T. Stephens, Houston, TX (US); Michael Wayne Sanders, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/759,802

(22) PCT Filed: Oct. 30, 2015

(86) PCT No.: PCT/US2015/058404
§ 371 (c)(1),
(2) Date: Mar. 13, 2018

(87) PCT Pub. No.: WO2017/074442
PCT Pub. Date: May 4, 2017

(65) Prior Publication Data
US 2018/0251674 A1     Sep. 6, 2018

(51) Int. Cl.
*E21B 43/267*     (2006.01)
*C09K 8/80*     (2006.01)

(52) U.S. Cl.
CPC .......... *C09K 8/805* (2013.01); *E21B 43/267* (2013.01)

(58) Field of Classification Search
CPC .......... C09K 8/80; C09K 8/805; E21B 43/267
See application file for complete search history.

(56) References Cited

U.S. PATENT DOCUMENTS

| | | | |
|---|---|---|---|
| 5,833,000 A * | 11/1998 | Weaver | C09K 8/5086 166/276 |
| 6,725,931 B2 | 4/2004 | Nguyen et al. | |
| 6,729,404 B2 | 5/2004 | Nguyen et al. | |
| 6,962,200 B2 | 11/2005 | Nguyen et al. | |
| 7,040,403 B2 | 5/2006 | Nguyen et al. | |
| 7,264,052 B2 | 9/2007 | Nguyen et al. | |
| 7,281,581 B2 | 10/2007 | Nguyen et al. | |
| 7,325,608 B2 | 2/2008 | van Batenburg et al. | |
| 7,581,590 B2 | 9/2009 | Lesko et al. | |
| 7,874,360 B2 | 1/2011 | Welton et al. | |

(Continued)

OTHER PUBLICATIONS

International Standard ISO 13503-2, "Petroleum and natural gas industries—Completion fluids and materials—Part 2: Measurement of properties of proppants used in hydraulic fracturing and gravel-packing operations, Amendment 1: Addition of Annex B: Proppand specification," Nov. 2009, 10 pages.

(Continued)

*Primary Examiner* — Silvana C Runyan
(74) *Attorney, Agent, or Firm* — McGuireWoods LLP

(57) ABSTRACT

Proppant aggregates comprising proppant particulates and a binding agent, wherein the proppant aggregate exhibits a conductivity of less than about 3000 millidarcy-feet when exposed to aggregate operational conditions, the aggregate operational conditions having a closure stress of at least about 100 pounds per square inch and a temperature of at least about 10° C.

20 Claims, 1 Drawing Sheet

(56) References Cited

U.S. PATENT DOCUMENTS

| | | | |
|---|---|---|---|
| 8,066,068 B2 | 11/2011 | Lesko et al. | |
| 8,113,283 B2 | 2/2012 | Welton et al. | |
| 2004/0000402 A1* | 1/2004 | Nguyen | C09K 8/68 |
| | | | 166/280.1 |
| 2006/0048944 A1* | 3/2006 | van Batenburg | C09K 8/62 |
| | | | 166/308.1 |
| 2007/0036977 A1 | 2/2007 | Sinclair et al. | |
| 2007/0114029 A1 | 5/2007 | Kazi | |
| 2007/0209794 A1 | 9/2007 | Kaufman et al. | |
| 2009/0178807 A1 | 7/2009 | Kaufman et al. | |
| 2011/0111990 A1* | 5/2011 | Pershikova | C04B 35/01 |
| | | | 507/219 |
| 2013/0161003 A1 | 6/2013 | Makarychev-Mikhailov et al. | |

OTHER PUBLICATIONS

International Standard ISO 13503-5, "Measuring the Long-term Conductivity of Proppants, Part 5: Procedures for measuring the long-term conductivity of proppants" Jul. 2008, 36 pages.

International Standard ISO 13503-2, "Petroleum and natural gas industries—Completion fluids and materials—Part 2: Measurement of properties of proppants used in hydraulic fracturing and gravel-packing operations, ANSI/API Recommended Practice 19C," First Edition, May 2008, 42 pages.

International Search Report and Written Opinion from PCT/US2015/058404, dated May 13, 2016, 12 pages.

\* cited by examiner

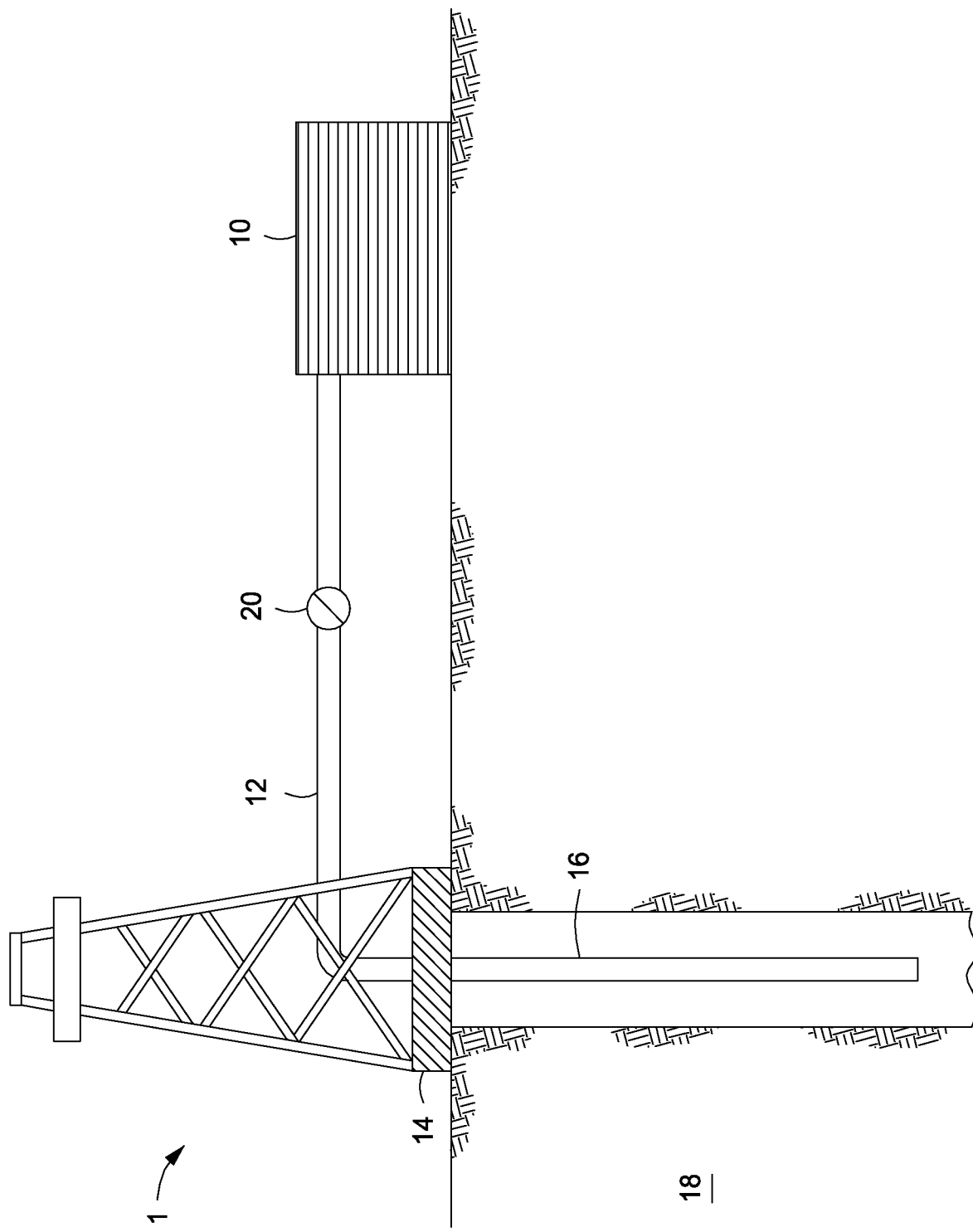

PROPPANT AGGREGATES FOR USE IN SUBTERRANEAN FORMATION OPERATIONS

BACKGROUND

The embodiments herein relate to subterranean formation operations and, more particularly, to proppant aggregates for use in subterranean formation operations.

Hydrocarbon producing wells (e.g., oil producing wells, gas producing wells, and the like) are created and stimulated using various treatment fluids introduced into the wells to perform a number of subterranean formation operations. The general term "treatment fluid," as used herein, refers generally to any fluid that may be used in a subterranean application in conjunction with a desired function and/or for a desired purpose. The term "treatment fluid" does not imply any particular action by the fluid or any component thereof.

Stimulation of hydrocarbon producing wells often involves introducing a fracturing treatment fluid, sometimes called a carrier treatment fluid when particulates entrained therein. The fracturing treatment fluid is pumped into a portion of a subterranean formation (which may also be referred to herein simply as a "formation") above a fracture gradient sufficient to break down the formation and create one or more fractures therein. As used herein, the term "fracture gradient" refers to a pressure necessary to create or enhance at least one fracture in a subterranean formation. Continuing to pump fluid will result in dilation and propagation of the fracture deep into the formation.

Typically, particulate solids are suspended in a portion of one or more treatment fluids and then deposited into the fractures deep within the formation. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

To enhance the conductivity of a fracture, individual proppant particulates may be formed into proppant aggregates. As used herein, the term "proppant aggregate" refers to a coherent body of proppant particulates, such that the proppant aggregate does not tend to disperse into smaller bodies without the application of shear. The proppant aggregates may be placed into the fracture(s) in a spaced apart fashion to maintain sufficient integrity to hold open the fracture once the hydraulic pressure is removed and allow for the flow of produced fluids. The individual proppant aggregates exist apart from the other proppant aggregates, rather than forming a traditional proppant bed wherein each proppant particulate is nestled against neighboring proppant particulates. In this way, there is more space between the aggregates for fluids to flow, rather than only being able to flow between the interstitial spaces of neighboring particles in a traditional bed.

BRIEF DESCRIPTION OF THE DRAWINGS

The following FIGURE are included to illustrate certain aspects of the embodiments herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 is a system configured for delivering the treatment fluids comprising the proppant aggregates described herein to a downhole location, according to one or more embodiments of the present disclosure.

DETAILED DESCRIPTION

The embodiments herein relate to subterranean formation operations and, more particularly, to proppant aggregates for use in subterranean formation operations.

The embodiments herein relate to the characteristics of formed proppant aggregates comprising traditionally deemed "subpar" proppant particulates and a binding agent, as well as testing methods designed to determine such characteristics. In traditional subterranean formation operations in which proppant particulates, either alone or in aggregate form, are used, the International Organization for Standardization (ISO) 13503 provides specifications for proppant particulates for use in hydraulic fracturing operations. Specifically, ISO 13503 provides fracturing proppant sizes, sphericity and roundness of proppant, acid solubility of proppant, maximum proppant turbidity, and maximum crush resistance for the material forming the proppant. (See ISO 13503-2, Amendment 1, 2006)). Accordingly, ISO 13503 provides the characteristics of proppant particulates used by the oil and gas industry for fracturing operations, and characteristics falling outside of these recommendations are generally deemed by the industry as unsatisfactory (or "subpar") for use in such operations.

For example, ISO 13503 provides the requirement that a fracturing proppant be sized within a designated coarse sieve and a designated fine sieve, where not over 0.1% of the proppant particulates are larger than the coarse sieve and not over 1.0% are smaller than the fine sieve. For fracturing proppant, a minimum of 90% of the proppant particulates must pass the coarse sieve and be retained on the fine sieve. Proppant particulates, according to ISO 13503, require an average sphericity of 0.7 or greater and an average roundness of 0.7 or greater for ceramic proppant particulates and require an average sphericity of 0.6 or greater and an average roundness of 0.6 or greater for non-ceramic proppant particulates. ISO 13503 further specifies that fracturing proppant should generate not exceed (or produce less than) 10% of crushed material ("fines") upon application of the highest stress level. The methodology for testing proppant particulates to comply with ISO 13503 is the American Petroleum Institute (API) Recommended Practice (RP) 19C (1$^{st}$ ed., May 2008), providing "Measurement of Properties of Proppants Used in Hydraulic Fracturing and Gravel-packing Operations." API RP19D (1$^{st}$ ed., May 2008), "Measuring the Long-term Conductivity of Proppants," further provides tests and test apparatuses for establishing the long-term conductivity of proppant particulates used in fracturing operations according to ISO 13503. Each reference to API RP19C and 19D herein are derived from the 1$^{st}$ ed., May 2008, whether or whether not specified.

The inventors of the present disclosure have discovered that the use of proppant particulates falling outside of one or more of the "standard" proppant characteristics provided in ISO 13503, but tested according to API RP19C and 19D, can be used to form superior proppant aggregates. The proppant aggregates of the present disclosure, for example, need only exhibit a preferred single property of mechanical strength, allowing the use of previously considered "subpar" particulates for use as proppant in forming such proppant aggregates. Such proppant particulates have heretofore been considered unusable for proppant aggregate formation, in particular for a conductive solution for forming proppant aggregates. Accordingly, the proppant aggregates of the present disclosure are formed using materials that may be more readily available and without geographical location restrictions and at a lower cost, without comprising strength and conductivity.

The proppant aggregates described herein comprise proppant particulates and a binding agent. As used herein, the term "binding agent" refers to a substance that coats or otherwise surrounds wholly or partially a proppant particulate that can enhance grain-to-grain contact between other proppant particulates, which may be uncoated or also wholly or partially coated with the binding agent. Suitable binding agents for use in forming the proppant aggregates of the present disclosure may include, but are not limited to, a non-aqueous tackifying agent, an aqueous tackifying agent, a silyl-modified polyamide compound, a curable resin (e.g., an epoxy resin), a crosslinkable aqueous polymer composition, a polymerizable organic monomer composition, a zeta potential-modifying aggregating composition, a silicon-based resin, a consolidation agent emulsion, a cement, asphalt, petroleum distillates, petroleum waste products, and any combination thereof. A suitable commercially available binding agent includes, but is not limited to, EXPEDITE® resin, available from Halliburton Energy Services, Inc. in Houston, Tex. The binding agents described herein may be coated wholly or partially onto the proppant particulates by any means suitable for the binding agent and proppant particulates selected including, but not limited to, dry coating, wet coating, flash coating, and any combination thereof.

To form the proppant aggregates described herein, the binding agent is generally present in an amount of about 0.5% to about 20% either volume by weight (vol/wt), if the binding agent is a liquid, or weight by weight (wt/wt) if the binding agent is a solid or a solid and liquid mixture, of the proppant particulates, encompassing any value and subset therebetween. For example, the binding agent may be present in an amount of about 0.5%, about 1%, about 3%, or about 4%, or about 5%, or about 6%, or about 7%, or about 8%, or about 9%, or about 10%, or about 11%, or about 12%, or about 13%, or about 14%, or about 15%, or about 16%, or about 17%, or about 18%, or about 19% or about 20% vol/wt (or wt/wt) of the proppant particulates, encompassing any value and subset therebetween. Each of these values is critical to the embodiments of the present disclosure and may depend on a number of factors including, but not limited to, the type of proppant particulates selected, the type of binding agent selected, the aggregate operational conditions of the subterranean formation as described below, and the like, and any combination thereof. For example, a higher concentration of binding agent can result in a thick coating about the proppant particulates forming the proppant aggregates, thus allowing larger footprints at contact points between the grains resulting in higher strength (e.g., unconfined compressive, compressive deformation, transversal deformation, and the like). Additionally, a higher concentration of binding agent reduces the porosity or pores spaces of individual proppant particulates and/or the proppant aggregates themselves, thus additionally impacting conductivity, and porosity, permeability.

In some embodiments, the binding agent may further comprise a solid reinforcing agent. The solid reinforcing agent may increase the mechanical integrity of the binding agent, such as to elevated temperatures, elevated pressures, and the like, in a downhole environment. The solid reinforcing agents may be in any shape including, but not limited to, spherical-shaped, rod-shaped, fiber-shaped, flake-shaped, thin-film shaped, amorphous-shaped, and the like, and any combination thereof. Suitable solid reinforcing agents may be composed of a material including, but not limited to, a mineral, a metal, a polymer, a plastic, a salt, a glass, a comminuted plant material, any nano-particulate thereof, and the like, and any combination thereof. Moreover, the solid reinforcing material may be itself degradable (or non-degradable).

The solid reinforcing agent, when included, is present in an amount of about 0.5% to about 50% either weight by weight (wt/wt), if the binding agent is a liquid, or weight by volume (wt/vol) if the binding agent is a solid or a solid and liquid mixture, of the binding agent, encompassing any value and subset therebetween. For example, the solid reinforcing agent may be present of from about 0.5% to about 1%, or 1% to about 5%, or 5% to about 10%, or 10% to about 15%, or about 15% to about 20%, or about 20% to about 25%, or about 25% to about 30%, or about 30% to about 35%, or about 35% to about 40%, or about 40% to about 45%, or about 45% to about 50%, or about 5% to about 45%, or about 10% to about 40%, or about 15% to about 35%, or about 20% to about 30% wt/vol (or wt/wt) of the binding agent, encompassing any value and subset therebetween. Each of these values is critical to the embodiments of the present disclosure and depend on a number of factors including, but not limited to, the desired mechanical strength of the binding agent, the type of binding agent selected, the type of reinforcing agent selected, and the like, and any combination thereof.

The proppant aggregates formed using the proppant particulates and the binding agent described herein may be used to form channels within a fracture in a subterranean formation after the removal of hydraulic pressure therefrom (also referred to as "fracture closure"). The fracture may be a natural fracture or one created or enhanced during a fracturing operation. As used herein, the term "channel" refers to a solids-free or substantially solids-free area within a fracture between two adjacent proppant aggregates or between a proppant aggregate and a face of the subterranean formation. A "substantially solids-free channel" comprises no more than about 50% of solid particulates by volume of the volume of the channel. For example, the substantially solids-free channel comprises no more than about 50%, about 45%, about 40%, about 35%, about 30%, about 25%, about 20%, about 15%, about 10%, about 5%, or even 0% of solids particulates by volume of the volume of the channel. As will be described below with reference to testing according to API RP19C and 19D, such channels may be simulated in a testing cell, where the face of the subterranean formation may be simulated by the wall of the testing cell.

Accordingly, the channels form conductive pathways for produced fluids to flow to the surface for recovery. This is contrary to traditional proppant packs (formed with traditional proppant particulates according to ISO 13503), which fill the volume of the fracture and are in contact with the entire face of the formation forming the fracture. Thus, the mechanical requirements of traditional proppant particulates forming traditional proppant packs favors very strong particulates that are crush resistant and will not break under the closure stress and temperatures encountered downhole to maintain adequate conductivity. That is, if the proppant were to crush, the interstitial spaces between the individual particulates would become clogged and block fluid flow of produced fluids in traditional proppant packs. As used herein, the term "fracture closure stress" or simply "closure stress" refers to the mechanical force experienced by a proppant pack or a proppant aggregate in a fracture in a subterranean formation after hydraulic pressure has been removed and fluid production (e.g., hydrocarbon fluids) has begun.

The mechanical requirements of the proppant aggregates described herein must withstand closure stress and resist deformation to sustain the availability of the channels. Accordingly, it follows that the proppant particulates forming the proppant aggregates be similar in characteristics (e.g., strength) to those proppant particulates used in forming traditional proppant packs (e.g., where the strength of the individual proppant particulates lends strength to the proppant aggregates). Surprisingly, the inventors of the present disclosure have discovered that wholly different or wholly different combinations of characteristics of proppant particulates for forming the proppant aggregates compared to traditional proppant particulates not only allows adequate performance of the proppant aggregates, but in fact improves proppant aggregate performance. That is, the proppant particulate characteristics forming the proppant aggregates described herein are opposite to those characteristics preferred for use as traditional proppant particulates. Indeed, should the proppant particulates described herein be used in traditional proppant pack formation, they would exhibit poor performance structurally and conductively, whereas their use in forming proppant aggregates achieves heightened structural and conductive performance compared to high quality (those meeting ISO 13503 requirements) particulates. Accordingly, the proppant particulates forming the proppant aggregates of the present disclosure need not be themselves conductive to generate an economic benefit of collecting produced fluids from a subterranean formation, rather the proppant aggregates merely require suitable crush resistance to withstand or substantially withstand fracture closure stress.

The embodiments described herein provide multiple characteristics of the proppant aggregates described herein (e.g., conductivity, crush resistance, aggregate stability, fines retention, and the like). It is to be understood that any one, multiple, or all of the proppant aggregates may have any one, multiple, or all of characteristics described herein, without departing from the scope of the present disclosure, provided that at least the conductivity characteristics are met (forming "operational proppant aggregates"). Each of the characteristics is critical to the embodiments described herein, whether alone or in combination, as they exhibit the necessary performance to prop open a fracture with the use of traditionally "subpar" proppant particulates.

Moreover, the embodiments described herein provide multiple characteristics of proppant particulates that can be used to form the proppant aggregates. It is also to be understood that any one, multiple, or all of the proppant particulates may have any one, multiple, or all of characteristics described herein, without departing from the scope of the present disclosure, provided that at least the conductivity characteristics are met. Each of the characteristics is critical to the embodiments described herein, whether alone or in combination, as they describe the use of traditionally "subpar" particulates as fracture propping material.

In some embodiments, the present disclosure provides a proppant aggregate comprising proppant particulates and a binding agent. Each of the proppant aggregate as a whole and the proppant particulates themselves exhibit particular characteristics. Accordingly, the characteristics of the proppant aggregates as a whole, as well as the characteristics of the "subpar" proppant particulates. It is to be understood that the proppant particulates pack together to form the proppant aggregate in the presence of the binding agent, but may be additionally be described in packed together form in the absence of the binding agent. That is, the characteristics of the proppant particulates are detailed herein both in the presence and absence of the binding agent. The characteristics of the proppant aggregate, on the other hand, are based on both the proppant particulates and binding agent in combined form.

In some embodiments, the proppant particulates described herein pack together in the absence of the binding agent to exhibit a conductivity of less than about 3000 millidarcy-feet (mD-ft) when exposed to particulate operational conditions. As used herein, the term "conductivity" with reference to the proppant particulates or proppant aggregates of the present disclosure refers to the capacity of proppant particulates packed together or the proppant aggregates to transmit fluid therethrough. As described herein, the conductivity of the proppant particulates is determined using API RP19D ($1^{st}$ ed., May 2008) based on Darcy's Law and Forchheimer's equations. Moreover, other means of determining conductivity (using Darcy's Law and Forchheimer's equations) may be used in accordance with the present disclosure to determine the desired characteristics of the proppant aggregates defined herein, without departing from the scope of the present disclosure. The conductivity of traditional proppant particulates is generally greater, sometimes exhibiting conductivities of greater than 3000 mD-ft, or greater than 4000 mD-ft, for example. As an example, it has been found that traditional proppant particulates indicate conductivity values of more than 3405 mD-ft at 10000 psi.

In some embodiments, the conductivity of the packed together proppant particulates in the absence of the binding agent exhibit a conductivity in the range of about 50 mD-ft to about 3000 mD-ft, encompassing any value and subset therebetween. For example, the packed together proppant particulates in the absence of the binding agent may exhibit a conductivity of about 50 mD-ft to about 500 mD-ft, or about 500 mD-ft to about 1000 mD-ft, or about 1000 mD-ft to about 1500 mD-ft, or about 1500 mD-ft to about 2000 mD-ft, or about 2000 mD-ft to about 2500 mD-ft, or about 2500 mD-ft to about 3000 mD-ft, or about 400 mD-ft to about 2600 mD-ft, or about 800 mD-ft to about 2200 mD-ft, or about 1200 mD-ft to about 1800 mD-ft, encompassing any value and subset therebetween. Each of these values is critical to the embodiments of the present disclosure and depend on a number of factors including, but not limited to, the particulate operational conditions experienced by the proppant particulates (as defined below), the material of the proppant particulates, the size or the proppant particulates, other characteristics of the proppant particulates (e.g., shape), and the like, and any combination thereof.

As used herein, the term "operational conditions" refers to downhole conditions within a subterranean formation comprising a closure stress and a temperature. As used herein, the "particulate operational conditions" for determining the characteristics of the proppant particulates described herein are closure stresses of greater than about 1000 pounds per square inch (psi) and temperatures of greater than about 50° F., where 1 psi is equivalent to 6894.76 Pascals and 50° F. is equivalent to 10° C. As used herein, the "aggregate operational conditions" for determining the characteristics of the proppant aggregates described herein are closure stresses of greater than about 100 psi and temperatures of greater than about 10° C. The measurements described herein for evaluating the characteristics of the proppant particulates are at particulate operational conditions as defined above, unless expressly stated otherwise. The closure stress of the particulate operational conditions is greater than about 1000 psi, or, in some embodiments, in the range of about 1000 psi to about 30000 psi, encompassing any value and subset therebetween. For example, the closure stress of the particulate operational conditions may be from about 1000 psi to about 5000 psi, or about 5000 psi to about 10000 psi, or about 10000 psi to about 15000 psi, or about 15000 psi to about 20000 psi, or about 20000 psi to about 25000 psi, or about 25000 psi to about 30000 psi, or about 2000 psi to about 28000 psi, or about 4000 psi to about 26000 psi, or about 6000 psi to about 24000 psi, or about 8000 psi to about 20000 psi, or about 10000 psi to about 18000 psi, or about 12000 psi to about 16000 psi, encompassing any value and subset therebetween. The temperature of the particulate operational conditions is greater than about 50° F., or, in some embodiments, in the range of about 50° F. to about 600° F., encompassing any value and subset therebetween. For example, the temperature of the particulate operational conditions may be from about 50° F. to about 100° F., or about 100° F. to about 200° F., or about 200° F. to about 300° F., or about 300° F. to about 400° F., or about 400° F. to about 500° F., or about 500° F. to about 600° F., or about 100° F. to about 550° F., or about 150° F. to about 500° F., or about 200° F. to about 450° F., or about 250° F. to about 400° F., or about 300° F. to about 350° F., encompassing any value and subset therebetween. Each of the closure stress and temperature values above for the particulate operational conditions is critical to the embodiments and depend on a number of factors including, but not limited to, the type of subterranean formation, the geographic location of the subterranean formation, and the like, and any combination thereof.

The measurements described herein for evaluating the characteristics of the proppant aggregates are at aggregate operational conditions as defined above, unless expressly stated otherwise. The closure stress of the aggregate operational conditions is greater than about 100 psi, or, in some embodiments, in the range of about 100 psi to about 50000 psi, encompassing any value and subset therebetween. For example, the closure stress of the aggregate operational conditions may be from about 100 psi to about 500 psi, or about 500 psi to about 1000 psi, or about 1000 psi to about 5000 psi, or about 5000 psi to about 10000 psi, or about 10000 psi to about 15000 psi, or about 15000 psi to about 20000 psi, or about 20000 psi to about 25000 psi, or about 25000 psi to about 30000 psi, or about 30000 psi to about 35000 psi, or about 35000 psi to about 40000 psi, or about 40000 psi to about 45000 psi, or about 45000 psi to about 50000 psi, or about 5000 psi to about 45000 psi, or about 10000 psi to about 40000 psi, or about 15000 psi to about 35000 psi, or about 20000 psi to about 30000 psi, encompassing any value and subset therebetween. The temperature of the aggregate operational conditions is greater than about 10° F., or, in some embodiments, in the range of about 10° F. to about 500° F., or in some embodiments in the range of about 40° F. t about 500° F., encompassing any value and subset therebetween. For example, the temperature of the aggregate operational conditions may be from about 10° F. to about 100° F., or about 40° F. to about 100° F., or about 100° F. to about 200° F., or about 200° F. to about 300° F., or about 300° F. to about 400° F., or about 400° F. to about 500° F., or about 50° F. to about 450° F., or about 100° F. to about 400° F., or about 150° F. to about 350° F., or about 200° F. to about 300° F., encompassing any value and subset therebetween. Each of the closure stress and temperature values above for the aggregate operational conditions is critical to the embodiments and depend on a number of factors including, but not limited to, the type of subterranean formation, the geographic location of the subterranean formation, and the like, and any combination thereof.

The conductivity tests are performed according to API RP19D and generally include packing proppant particulates or binding agent coated proppant particulates forming proppant aggregate(s) into a testing cell (i.e., a "conductivity testing cell"), exposing the testing cell to particulate or aggregate operational conditions (which may also be used to cure or set the binding agent to form the proppant aggregates), and measuring the conductivity of the packed particulates or aggregate. In some embodiments, when the conductivity tests are performed on proppant aggregates, the binding agent is dry coated or wet coated onto the proppant particulates. When the binding agent is dry coated, the dry coated proppant particulates may be dispersed into an aqueous fluid, and the aqueous fluid decanted from the dry coated proppant particulates prior to packing them into the testing cell.

In some embodiments, a conductivity test performed according to API RP19D may be adapted such that one or more channels (i.e., solids-free or substantially solids-free channel, as described above) is formed in the testing cell between adjacent proppant "pillars," which may simply be proppant particulates packed together in the absence of a binding agent, or may be proppant particulates forming proppant aggregates in the presence of a binding agent. Accordingly, the term "proppant pillars" or simply "pillars" encompasses both packed forms of the proppant particulates described herein. When such channel(s) are formed in the testing cell, the channels are designed such that the proppant pillars occupy in the range of about 1% to about 99% of the available cross-sectional area of the testing cell, encompassing any value and subset therebetween. For example, the proppant pillars may occupy about 1% to about 15%, or about 15% to about 29%, or about 29% to about 43%, or about 43% to about 57%, or about 57% to about 71%, or about 71% to about 85%, or about 85% to about 99%, or about 10% to about 90%, or about 20% to about 80%, or about 30% to about 70%, or about 40% to about 60%, encompassing any value and subset therebetween. Each of these values is critical to the embodiments of the present disclosure and depend on a number of factors including, but not limited to, the particulate and/or aggregate operational conditions of the subterranean formation, the crush resistance of the proppant particulates, the crush resistance of the proppant aggregates, other characteristics of the proppant particulates as described herein, other characteristics of the proppant aggregates, and the like and any combination thereof.

Accordingly, the API RP19D testing cell is typically filled 100% with proppant particulates and/or proppant particulates and a binding agent forming proppant aggregates. However, a channel may occupy as little as about 1% of the cross-sectional space of the testing cell (and up to about 99%) to measure conductivity of the proppant particulates and/or proppant aggregate(s). Regardless of the presence or absence of a channel, however, the conductivity of the packed proppant particulates and/or the proppant aggregates of the present disclosure is the conductivity through those packed particulates or aggregates, and does not take into account the conductivity of an entire testing cell having channels therein. Accordingly, the conductivity of a testing cell having channels will be greater, and in some instances significantly greater depending on the size of the channels, as compared to the conductivity of the packed particulates or aggregates therein. This is a novel aspect of the present disclosure, as it demonstrates the ability to use "subpar" proppant particulates to form proppant aggregates without compromising conductivity of a propped fracture.

It is to be understood that the particulate or aggregate closure stress operational conditions may be experienced directly by the packed proppant particulates or proppant aggregates within an API RP19D testing cell when there are no channels present. However, as channels are placed within the testing cell, and the particulate and aggregate operational conditions are applied to the API RP19D testing cell, the stress experienced by the packed particulates or aggregates is increased, as the channel(s) does not absorb the closure stress. For example, the closure stress applied to the testing cell is the particulate or aggregate operational conditions, but the stress experienced by the packed particulates or aggregates where a channel is present is up to about 400% greater than the closure stress of the operational conditions, such as up to about 2000000 psi. This too is another novel aspect of the present disclosure, as the use of "subpar" particulates to form the proppant aggregates used herein is still capable of withstanding the increased closure stress without compromising the integrity of a propped fracture.

In some embodiments, the stress experienced by the packed particulates or aggregates where a channel is present is, for example, greater than the range of operational conditions disclosed herein, such as in the range of about 21000 psi to about 2000000 psi, encompassing any value and subset therebetween. For example, the stress experienced by the packed particulates or aggregates where a channel is present may be from about 2100 psi to about 10000 psi, or about 10000 psi to about 100000 psi, or about 100000 psi to about 250000 psi, or about 250000 psi to about 500000 psi, or about 500000 psi to about 750000 psi, or about 750000 psi to about 1000000 psi, or about 1000000 psi to about 1250000 psi, or about 1250000 psi to about 1500000 psi, or about 1500000 psi to about 1750000 psi, or about 1750000 psi to about 2000000 psi, encompassing any value and subset therebetween. Each of these values is critical to the embodiments of the present disclosure and depend on a number of factors including, but not limited to, the size of the channel(s), the size of the packed particulates or aggregates, and the like, and any combination thereof.

In some embodiments, any or all of the tests described herein and measured using API RP19D or API19C, described below, is performed in the presence of a liquid, which can be used to simulate a treatment fluid within a fracture subjected to particulate or aggregate operational closures. In such instances, the increased stress experienced by the packed particulates or aggregates in the presence of a channel may be reduced as compared to the channels having only air present or in a vacuum, as the fluid absorbs some of the stress.

In some embodiments, the conductivity of the proppant particulates described herein without a channel in the API RP19D testing cell, whether (in the presence of) or whether not (in the absence of) a binding agent, is less than 50%, to a lower limit of 0.5%, of the conductivity of the proppant particulates measured in the presence of at least one channel in the API RP19D testing cell, as described above. Accordingly, in some embodiments, the conductivity of the proppant particulates described herein without a channel in the API RP19D testing cell, whether (in the presence of) or whether not (in the absence of) a binding agent, is less than about 50%, or less than about 45%, or less than about 40%, or less than about 35%, or less than about 30%, or less than about 25%, or less than about 20%, or less than about 15%, or less than about 10%, or less than about 5%, or less than about 1%, or 0.5% less than the conductivity of the proppant particulates measured in the presence of at least one channel in the API RP19D testing cell, as described above, encompassing any value and subset therebetween. Each of these values is critical to the embodiments of the present disclosure and depend on a number of factors including, but not limited to, the size of the channel, the number of channels, the operational conditions, the other characteristics of the proppant particulates as described herein, and the like, and any combination thereof.

The proppant aggregates (particulates and binding agent combined) described herein themselves have a conductivity of less than about 3000 mD-ft upon exposure to aggregate operational temperatures as measured by API RP19D either in the presence or absence of a channel. In some embodiments, the application of the binding agent to the proppant particulates may not affect conductivity and, accordingly, the conductivity of the proppant particulates alone is equal to the conductivity of the proppant aggregates. In other instances, coating of the binding agent reduces the conductivity of the proppant aggregates, as the binding agent flows or is otherwise deposited between the interstitial spaces of individual proppant particulates, thus blocking conductivity. It is a novel feature of the present disclosure that the reduction of conductivity of the proppant aggregate does not adversely affect the performance of the proppant aggregates, as will be further seen with reference to the crush resistance of the proppant particulates. Rather, the reduced conductivity, where such reduction occurs, may provide enhanced crush strength or deformation strength to the proppant aggregate.

In some embodiments, the conductivity of the proppant aggregate is in the range of about 10 mD-ft to about 3000 mD-ft upon exposure to aggregate operational temperatures as measured by API RP19D either in the presence or absence of a channel, encompassing any value and subset therebetween. For example, the proppant aggregates may exhibit a conductivity of about 10 mD-ft to about 50 mD-ft, or 50 mD-ft to about 500 mD-ft, or about 500 mD-ft to about 1000 mD-ft, or about 1000 mD-ft to about 1500 mD-ft, or about 1500 mD-ft to about 2000 mD-ft, or about 2000 mD-ft to about 2500 mD-ft, or about 400 mD-ft to about 2600 mD-ft, or about 800 mD-ft to about 2200 mD-ft, or about 1200 mD-ft to about 1800 mD-ft upon exposure to aggregate operational temperatures as measured by API RP19D either in the presence or absence of a channel, encompassing any value and subset therebetween. Each of these values is critical to the embodiments of the present disclosure and depend on a number of factors including, but not limited to, the aggregate operational conditions experienced by the proppant aggregates, the material of the proppant particulates, the type and amount of binding agent, the size proppant particulates, other characteristics of the proppant particulates, other characteristics of the proppant aggregates, and the like, and any combination thereof.

As a specific example, the proppant aggregate(s) exhibit a conductivity of less than about 3000 mD-ft upon exposure to aggregate operational temperatures as measured by API RP19D in the presence of a channel upon exposure to aggregate operational conditions, where the channel occupies no more than about 1% of the cross-sectional area of the testing cell and the proppant aggregate(s) occupies at least about 99% of the cross-sectional area of the testing cell.

When a channel is present in the API RP19D testing cell, as discussed above, the channel itself may exhibit a conductivity. The channel is substantially solids-free and thus depending on its size, generally exhibits a conductivity equal to or greater than that of the proppant aggregates described herein. In some embodiments, the difference between the conductivity of the channel and the proppant aggregate as measured by API RP19D is at least about 100 mD-ft at aggregate operational conditions. In some embodiments, the difference between the conductivity of the channel and the proppant aggregate as measured by API RP19D is in the range of about 100 mD-ft to about 100000 mD-ft at aggregate operational conditions, or even greater, encompassing any value and subset therebetween. For example, the difference between the conductivity of the channel and the proppant aggregate as measured by API RP19D may be from about 100 mD-ft to about 500 mD-ft, or about 500 mD-ft to about 1000 mD-ft, or about 1000 mD-ft to about 5000 mD-ft, or about 5000 mD-ft to about 10000 mD-ft, or about 10000 mD-ft to about 20000 mD-ft, or about 20000 mD-ft to about 30000 mD-ft, or about 30000 mD-ft to about 40000 mD-ft, or about 40000 mD-ft to about 50000 mD-ft, or about 50000 mD-ft to about 60000 mD-ft, or about 60000 mD-ft to about 70000 mD-ft, or about 70000 mD-ft to about 80000 mD-ft, or about 80000 mD-ft to about 90000 mD-ft, or about 10000 mD-ft to about 90000 mD-ft, or about 20000 mD-ft to about 80000 mD-ft, or about 30000 mD-ft to about 70000 mD-ft, or about 40000 mD-ft to about 60000 mD-ft at aggregate operational conditions, encompassing any value and subset therebetween. Each of these values is critical to the embodiments of the present disclosure and depend on a number of factors including, but not limited to, the size and number of channel(s), the conductivity of the proppant aggregate, the aggregate operational conditions (e.g., at what aggregate operational conditions the conductivity difference is measured), and the like, and any combination thereof.

When a channel is present in the API RP19D testing cell, as discussed above, the conductivity sustainability as measured in accordance with API RP19D of the proppant aggregates described herein is in the range of about 1% to about 99% after application of at least one cyclic load relative to the aggregate operational conditions, encompassing any value and subset therebetween, and in any case maintains a conductivity of greater than about 100 mD-ft. For example, when a channel is present in the API RP19D testing cell, the conductivity sustainability as measured in accordance with API RP19D of the proppant aggregates described herein may be about 1% to about 15%, or about 15% to about 29%, or about 29% to about 43%, or about 43% to about 57%, or about 57% to about 71%, or about 71% to about 85%, or about 85% to about 99%, or about 10% to about 90%, or about 20% to about 80%, or about 30% to about 70%, or about 40% to about 60% after application of at least one cyclic load relative to the aggregate operational conditions, encompassing any value and subset therebetween, and in any case maintains a conductivity of greater than about 100 mD-ft. In certain embodiments, when a channel is present in the API RP19D testing cell, the conductivity sustainability as measured in accordance with API RP19D of the proppant aggregates described herein is greater than about 50%, greater than about 55%, greater than about 60%, greater than about 65%, greater than about 70%, greater than about 75%, greater than about 80%, greater than about 85%, greater than about 90%, greater than about 95%, greater than about 96%, greater than about 97%, greater than about 98%, or greater than about 99%, such that a minimum amount of conductivity changes upon application of at least one cyclic load.

Each of the above values for conductivity sustainability is critical to the embodiments of the present disclosure and depend on a number of factors including, but not limited to, the composition of the proppant aggregates, the aggregate operational conditions, the type of cyclic load applied, the number of cyclic loads applied, the size of the channel, and the like, and any combination thereof.

As used herein, the term "conductivity sustainability" is a ratio, expressed as a percentage, of final conductivity to initial conductivity after exposure to one or more cyclic loads. The higher the conductivity sustainability value (a high percentage value), the less effect of the one or more cyclic loads on the conductivity of the object (e.g., the proppant aggregate(s)). As used herein, the term "cyclic load" refers to altering the stress on a testing cell in a uniform manner. Specifically with reference to the proppant particulates described herein, a "cyclic load" refers to (1) altering the stress on the testing cell (or aggregate) either above or below an initial aggregate operational conditions closure stress and (2) returning the stress on the testing cell (or aggregate) to the initial aggregate operational conditions closure stress. Generally, the period of a cyclic load is in the range of at least about 1 minute to about 6000 minutes, encompassing any value and subset therebetween. There may be a hold time between (1) and (2) of the cyclic load in the range of the times provided.

The conductivity sustainability tests are performed according to API RP19D and generally include packing binding agent coated proppant particulates forming proppant aggregate(s) into a testing cell (i.e., a "conductivity sustainability testing cell"), forming at least one channel in the testing cell as described above, exposing the testing cell to aggregate operational conditions (which may also be used to cure or set the binding agent to form the proppant aggregates), performing at least one cyclic load, and measuring the conductivity sustainability of the aggregate. In some embodiments, the binding agent is dry coated or wet coated onto the proppant particulates. When the binding agent is dry coated, the dry coated proppant particulates may be dispersed into an aqueous fluid, and the aqueous fluid decanted from the dry coated proppant particulates prior to packing them into the testing cell.

For a cyclic load, the initial stress on the proppant aggregates is an aggregate operational conditions closure stress, and the pressure change applied to the API RP19D testing cell may be any percentage greater than or less than the initial closure stress, such that the second pressure applied to the APR RP19D testing cell during the cyclic load is in the range of about 100 psi to about 2000000 psi, encompassing any value and subset therebetween. For example, in some embodiments, the second pressure during the cyclic load may be about 100 psi to about 500 psi, or about 500 psi to about 1000 psi, or about 1000 psi to about 10000 psi, or about 10000 psi to about 100000 psi, or about 100000 psi to about 250000 psi, or about 250000 psi to about 500000 psi, or about 500000 psi to about 750000 psi, or about 750000 psi to about 1000000 psi, or about 1000000 psi to about 1250000 psi, or about 1250000 psi to about 1500000 psi, or about 1500000 psi to about 1750000 psi, or about 1750000 psi to about 2000000 psi, encompassing any value and subset therebetween. Each of these values is critical to the embodiments of the present disclosure and depend on a number of factors including, but not limited to, the initial aggregate operational conditions closure stress, the cyclic stress expected to be encountered in the subterranean formation, and the like, and any combination thereof.

As used herein, the term "cyclic stress" refers to cyclic changes in closure stress after the closure stress has been exerted. Cyclic stress can result in changes in the closure stress such as due to shut-ins, workovers, connections to pipelines, and the like.

The one or more cyclic loads for achieving the desired conductivity sustainability for the proppant aggregates described above may be a single cyclic load, or, in some embodiments, in the range of 1 cyclic load to 30 cyclic loads, encompassing any value and subset therebetween. For example, the proppant aggregates may be subjected to 1, 2, 3, 4, 5, 6, 7, 8, 9, 0, 11, 12, 13, 14, 15, 16, 17, 18, 19, 20, 21, 22, 23, 24, 25, 26, 27, 28, 29, or 30 cyclic load(s) for determining the conductivity sustainability. Each of these values is critical to the embodiments of the present disclosure and depend on a number of factors including, but not limited to, the initial aggregate operational conditions closure stress, the cyclic stress expected to be encountered in the subterranean formation, and the like, and any combination thereof.

As a specific example, the proppant aggregate(s) exhibit a conductivity sustainability of at least 99% after application of at least one cyclic load as measured by API RP19D in the presence of a channel upon exposure to aggregate operational conditions, where the channel occupies no more than about 1% of the cross-sectional area of the testing cell and the proppant aggregate(s) occupies at least about 99% of the cross-sectional area of the testing cell.

The proppant aggregates described herein exhibit an aggregate stability as measured by API RP19D ($1^{st}$ ed., May 2008), referenced above, of at least about 20% in the presence of a channel upon exposure to aggregate operational conditions, such as at least about 20%, at least about 30%, at least about 40%, at least about 50%, at least about 60%, at least about 70%, at least about 80%, at least about 90%, up to 100%. In preferred embodiments, an aggregate stability as measured by API RPI19D is at least 80% in the presence of a channel upon exposure to aggregate conditions. As used herein, the term "aggregate stability" refers to a measure of the ability of a proppant aggregate to remain a coherent body as originally placed within a conductivity testing cell after the conductivity of the aggegate has been evaluated. Accordingly, after the conductivity test is performed, the amount of material that remains inside the original aggregate (i.e., and not in the channel space) represents the aggregate stability. A high aggregate stability is accordingly desirable, including an aggregate stability of 100% upon exposure to aggregate operational conditions.

The aggregate stability tests are performed according to API RP19D and generally include packing binding agent coated proppant particulates forming proppant aggregate(s) into a conductivity testing cell, forming at least one channel in the testing cell, exposing the testing cell to aggregate operational conditions (which may also be used to cure or set the binding agent to form the proppant aggregates), measuring the conductivity of the aggregate, and thereafter measuring the aggregate stability. In some embodiments, the aggregate stability tests described herein identify only fines separated from the proppant aggregate(s) in the API RP19D testing cell that are smaller than the proppant aggregate and larger than a unit mesh particle size of 10 µm. In some embodiments, the binding agent is dry coated or wet coated onto the proppant particulates. When the binding agent is dry coated, the dry coated proppant particulates may be dispersed into an aqueous fluid, and the aqueous fluid decanted from the dry coated proppant particulates prior to packing them into the testing cell.

In some embodiments, the proppant aggregates described herein exhibit an aggregate stability as measured by API RP19D of about 80%, or about 81%, or about 82%, or about 83%, or about 84%, or about 85%, or about 86%, or about 87%, or about 88%, or about 89%, or about 90% or about 91%, or about 92%, or about 93%, or about 94%, or about 95%, or about 96%, or about 97%, about 98%, or about 99%, or about 100%, or 100% in the presence of a channel upon exposure to aggregate operational conditions. Each of these values is critical to the embodiments and depend on a number of factors including, but not limited to, the type of binding agent selected, the aggregate operational conditions, the size and number of channel(s) in the API RP19D testing cell, and the like, and any combination thereof.

The aggregate stability characteristics of the proppant aggregates may additionally be tested upon application of one or more cyclic loads, where it is anticipated that certain cyclic loads will be encountered in a subterranean formation. In such cases, the aggregate stability characteristics of the proppant aggregates are sustained upon application of the one or more cyclic loads, such that they retain the desired performance described herein when exposed to said cyclic loads in a formation. When applied, the number of cyclic loads may be 1, 2, 3, 4, 5, 6, 7, 8, 9, 0, 11, 12, 13, 14, 15, 16, 17, 18, 19, 20, 21, 22, 23, 24, 25, 26, 27, 28, 29, or 30 cyclic load(s) for determining the aggregate stability (or conductivity and aggregate stability determined thereafter). Each of these values is critical to the embodiments of the present disclosure and depend on a number of factors including, but not limited to, the initial aggregate operational conditions closure stress, the cyclic stress expected to be encountered in the subterranean formation, and the like, and any combination thereof.

As a specific example, the proppant aggregate(s) exhibit an aggregate stability of greater than about 80% as measured by API RP19D in the presence of a channel and upon exposure to aggregate operational conditions, where the channel occupies no more than about 1% of the cross-sectional area of the testing cell and the proppant aggregate(s) occupies at least about 99% of the cross-sectional area of the testing cell.

The proppant aggregates described herein exhibit fines capture as measured by API RP19D ($1^{st}$ ed., May 2008), referenced above, of at least about 0.1% for fine particles having a unit mesh size of less than about 1000 µm in the presence of a channel upon exposure to aggregate operational conditions. As used herein, the term "fines capture" refers to a measure of the ability of a proppant aggregate to capture fine particles (less than about 1000 µm) that come into contact with the proppant aggregate (e.g., that are free floating in a treatment fluid) and thus prevent their continued mobility within a fracture after, which could hinder fracture conductivity or result in subterranean formation operation equipment damage. A high fines capture is preferred, however, even a low amount of fines capture is also desirable as it indicates that the aggregate is capturing at least some fine particles and thus preventing their migration into pore spaces or other areas within a fracture and potentially hinder the fracture's conductivity or damage subterranean formation operation equipment.

The fines capture tests are performed according to API RP19D and generally include packing binding agent coated proppant particulates forming proppant aggregate(s) into a conductivity testing cell, forming at least one channel in the testing cell, exposing the testing cell to aggregate operational conditions (which may also be used to cure or set the binding agent to form the proppant aggregates), flowing a treatment fluid comprising fine particles having a unit mesh particle size of less than about 1000 μm, and measuring the fines capture of the aggregate. In some embodiments, the binding agent is dry coated or wet coated onto the proppant particulates. When the binding agent is dry coated, the dry coated proppant particulates may be dispersed into an aqueous fluid, and the aqueous fluid decanted from the dry coated proppant particulates prior to packing them into the testing cell.

The fines particles that may be tested for fines capture in the API RP19D testing cell have a unit mesh particle size of less than about 1000 μm, and in some embodiments, in the range of about 1 μm to about 1000 μm, encompassing any value and subset therebetween. For example, the fines particles that may be flowed into the API RP19D testing cell may have a unit mesh particle size of about 1 μm to about 50 μm, or about 50 μm to about 100 μm, or about 100 μm to about 200 μm, or about 200 μm to about 400 μm, or about 400 μm to about 600 μm, or about 600 μm to about 800 μm, or about 800 μm to about 1000 μm, or about 200 μm to about 800 μm, or about 400 μm to about 600 μm, encompassing any value and subset therebetween. Each of these values is critical to the embodiments of the present disclosure and depend on a number of factors including, but not limited to, the type of subterranean formation, the type of fine particles expected to be encountered in the subterranean formation, the size of the crushed fines expected to be created by the proppant aggregate (if any), and the like, and any combination thereof.

In some embodiments, the proppant aggregates described herein exhibit a fines capture as measured by API RP19D in the range of about 0.1% to about 99% in the presence of a channel and upon exposure to aggregate operational conditions, encompassing any value and subset therebetween. For example, the proppant aggregates described herein may exhibit a fines capture as measured by API RP19D of about 0.1% to about 1%, or about 1% to about 15%, or about 15% to about 29%, or about 29% to about 43%, or about 43% to about 57%, or about 57% to about 71%, or about 71% to about 85%, or about 85% to about 99%, or about 10% to about 90%, or about 20% to about 80%, or about 30% to about 70%, or about 40% to about 60% in the presence of a channel and upon exposure to aggregate operational conditions, encompassing any value and subset therebetween. Each of these values is critical to the embodiments of the present disclosure and depend on a number of factors including, but not limited to, the binding agent selected, the porosity of the proppant aggregate, the conductivity of the proppant aggregate, the size and shape of the fines particles, and the like, and any combination thereof.

The fines capture characteristics of the proppant aggregates may additionally be tested upon application of one or more cyclic loads, where it is anticipated that certain cyclic loads will be encountered in a subterranean formation. In such cases, the fines capture characteristics of the proppant aggregates are sustained upon application of the one or more cyclic loads, such that they retain the desired performance described herein when exposed to said cyclic loads in a formation. When applied, the number of cyclic loads may be 1, 2, 3, 4, 5, 6, 7, 8, 9, 0, 11, 12, 13, 14, 15, 16, 17, 18, 19, 20, 21, 22, 23, 24, 25, 26, 27, 28, 29, or 30 cyclic load(s) for determining the fines capture. Each of these values is critical to the embodiments of the present disclosure and depend on a number of factors including, but not limited to, the initial aggregate operational conditions closure stress, the cyclic stress expected to be encountered in the subterranean formation, and the like, and any combination thereof.

As a specific example, the proppant aggregate(s) exhibit an fines capture of greater than about 0.1% for fine particles having a unit mesh size of less than about 1000 μm as measured by API RP19D in the presence of a channel and upon exposure to aggregate operational conditions, where the channel occupies no more than about 1% of the cross-sectional area of the testing cell and the proppant aggregate(s) occupies at least about 99% of the cross-sectional area of the testing cell.

It is to be understood that although separate API RP19D tests may be performed for each of the types of conductivity analysis (including aggregate stability) described herein for a single proppant aggregate(s) composition, a single API RP19D test may be performed to glean all of the desired information, without departing from the scope of the present disclosure. Separate tests may be desirable, for example, when the size of the channel is to be changed, when the aggregate operational conditions are to be changed, and the like, and any combination thereof.

The proppant particulates selected for forming the proppant aggregates of the present disclosure exhibit a crush resistance as measured by API RP19C (1$^{st}$ ed., May 2008), referenced above, of greater than about 10% fines when exposed to particulate operational conditions in the presence or absence of a channel. As used herein, the term "crush resistance" refers to a measure of the amount of fines formed upon application of a stress (e.g., simulated or actual closure stress), thus translating into a measure of the reduction in size of the proppant particulates or proppant aggregate(s) due to the stress. As used herein, the term "fines" refers to portions of proppant particulate material or proppant aggregate material that has separated from the original particulate or aggregate due to the application of a stress (e.g., simulated or actual closure stress), and in some instances the stress in the presence of a particular temperature (e.g., simulated or actual downhole temperature).

The crush resistance tests are performed according to API RP19C and generally include packing particulates or binding agent coated proppant particulates forming proppant aggregate(s) into a testing cell (i.e., a "crush resistance testing cell"), exposing the testing cell to particulate or aggregate operational conditions (which may also be used to cure or set the binding agent to form the proppant aggregates), and measuring the crush resistance of the aggregate. In some embodiments, when the crush resistance tests are performed on proppant aggregates and at least one channel is formed in the testing cell as described above (a channel may also be formed when testing the proppant particulates), and the binding agent is dry coated or wet coated onto the proppant particulates. When the binding agent is dry coated, the dry coated proppant particulates may be dispersed into an aqueous fluid, and the aqueous fluid decanted from the dry coated proppant particulates prior to packing them into the testing cell.

The decreased crush resistance of the proppant particulates described herein is wholly opposite to the desired crush resistance of traditional proppant particulates (and ISO 13503) as described above. The formation of fines by individual proppant particulates forming a proppant aggregate is surprisingly desirable as the created fines wedge or otherwise take up space between individual proppant particulates, thus increasing the strength of the proppant aggregate as a whole and allowing the proppant aggregate to absorb stress more effectively. Because the proppant aggregates rely largely, and in some instances wholly, on the conductivity of channels, that the crushed fines occupy such interstitial spaces is of no import to the embodiments described herein, as discussed previously with reference to conductivity. Of course, it may be desirable to additionally have conductivity or porosity within the proppant aggregates, without departing from the scope of the present disclosure, to further enhance the flow of produced fluids from the formation.

As discussed above, the proppant particulates exhibit a crush resistance of greater than about 10% fines when exposed to particulate operational conditions as measured by API RP19C in the presence or absence of a channel, including up to an upper limit of 100% fines. Accordingly, in some embodiments, the proppant particulates exhibit a crush resistance of greater than about 10% fines, or greater than about 15% fines, or greater than about 20% fines, or greater than about 30% fines, or greater than about 35% fines, or greater than about 40% fines, or greater than about 50% fines, or greater than about 55% fines, or greater than about 60% fines, or greater than about 70% fines, or greater than about 75% fines, or greater than about 80% fines, or greater than about 85% fines, or greater than about 90% fines, or greater than about 95% fines, or greater than about 99% fines, or 100% fines when exposed to particulate operational conditions as measured by API RP19C, encompassing any value and subset therebetween. Each of these values is critical to the embodiments of the present disclosure and depend on a number of factors including, but not limited to, the desired crush resistance, the particulate operational conditions, the various characteristics of the proppant particulates as described herein, and the like, and any combination thereof. Indeed, the ability to use particulates that exhibit a crush resistance of greater than 10% fines, including up to 100% fines, is wholly contrary to traditional proppant particulates.

The proppant aggregates exhibit a very different crush resistance as compared to the individual proppant particulates forming the proppant aggregates. Indeed, the proppant aggregates have a crush resistance of less than about 90% fines when exposed to aggregate operational conditions in the presence of a channel in an API RP19C testing cell. In some embodiments, the proppant aggregates have a crush resistance in the range of about 0.1% to about 90% fines when exposed to aggregate operational conditions in the presence of a channel in a API RP19C testing cell, encompassing any value and subset therebetween. For example, the proppant aggregates may have a crush resistance of about 0.1% fines to about 18% fines, or about 18% fines to about 36% fines, or about 36% fines to about 54% fines, or about 54% fines to about 72% fines, or about 72% fines to about 90% fines, or about 10% fines to about 80% fines, or about 20% fines to about 70% fines, or about 30% fines to about 60% fines, or about 20% fines to about 40% fines when exposed to aggregate operational conditions in the presence of a channel in a API RP19C testing cell, encompassing any value and subset therebetween. Each of these values is critical to the embodiments of the present disclosure and depend on a number of factors including, but not limited to, the type of proppant particulates selected, the type of binding agent selected, the aggregate operational conditions, and the like, and any combination thereof.

In addition, in preferred embodiments, not only do the proppant aggregates exhibit a crush resistance of greater than about 90% fines as measured by API RP19C when exposed to aggregate operational conditions in the presence of a channel in a API RP19C testing cell, but any created fines have a unit mesh size of less than 2000 µm. This small fines size ensures that the proppant aggregates are able to withstand fracture closure stress without forming fines that may clog or otherwise hinder the conductivity of a fracture to produced fluids. In some embodiments, any fines created by the proppant aggregates of the present disclosure upon being subjected to a crush resistance test have a unit mesh size in the range of about 1 µm to about 200 µm, encompassing any value and subset therebetween, such as about 1 µm to about 40 µm, or about 40 µm to about 80 µm, or about 80 µm to about 120 µm, or about 120 µm to about 160 µm, or about 160 µm to about 200 µm, or about 40 µm to about 160 µm, or about 80 µm to about 120 µm, encompassing any value and subset therebetween. It is to be understood that powdered fines, or fines smaller than about 1 µm, may additionally be formed, without departing from the scope of the present disclosure. Each of the above values is critical to the embodiments of the present disclosure and depend on a number of factors including, but not limited to, the type of proppant particulates selected, the type of binding agent selected, the aggregate operational conditions, and the like, and any combination thereof.

The crush resistance characteristics of the proppant aggregates may additionally be tested upon application of one or more cyclic loads, where it is anticipated that certain cyclic loads will be encountered in a subterranean formation. In such cases, the crush resistance characteristics of the proppant aggregates are sustained upon application of the one or more cyclic loads, such that they retain the desired performance described herein when exposed to said cyclic loads in a formation. When applied, the number of cyclic loads may be 1, 2, 3, 4, 5, 6, 7, 8, 9, 0, 11, 12, 13, 14, 15, 16, 17, 18, 19, 20, 21, 22, 23, 24, 25, 26, 27, 28, 29, or 30 cyclic load(s) for determining the crush resistance. Each of these values is critical to the embodiments of the present disclosure and depend on a number of factors including, but not limited to, the initial aggregate operational conditions closure stress, the cyclic stress expected to be encountered in the subterranean formation, and the like, and any combination thereof.

As a specific example, the proppant aggregate(s) exhibit a crush resistance of less than about 90% fines, where such fines have a unit mesh size of less than 2000 µm as measured by API RP19C in the presence of a channel upon exposure to aggregate operational conditions, where the channel occupies no more than about 1% of the cross-sectional area of the testing cell and the proppant aggregate(s) occupies at least about 99% of the cross-sectional area of the testing cell.

The proppant aggregates described herein exhibit a fines retention in the range of at least about 1% (including up to 100%) in the presence of a channel upon exposure to aggregate operational conditions. As used herein, the term "fines retention" refers to a measure of the amount of fines retained within the body of a proppant aggregate within a crush resistance testing cell after the crush resistance of the aggregate has been evaluated. Accordingly, after the crush resistance test is performed, the amount of fines (i.e., crushed material) material that remains inside the original aggregate (i.e., and not in the channel space) represents the fines retention. A high fines retention is preferred, however, even a low amount of fines retention is also desirable as it indicates that the fines measured by the crush resistance test (and falling within the specifications herein for desired proppant aggregates) remains within the structure or body of the aggregate and would not migrate into pore spaces or other areas within a fracture and potentially hinder the fracture's conductivity or damage subterranean formation operation equipment.

The fines resistance tests are performed after a crush resistance test according to API RP19C (1$^{st}$ ed., May 2008) and generally include packing binding agent coated proppant particulates forming proppant aggregate(s) into a conductivity testing cell, forming at least one channel in the testing cell, exposing the testing cell to aggregate operational conditions (which may also be used to cure or set the binding agent to form the proppant aggregates), measuring the crush resistance of the aggregate, and thereafter measuring the fines resistance. The fines resistance may be determined using CT scanning; mechanical, physical, or chemical removal of the material; microscopy (e.g., optical microscopy, electron microscopy, and the like); and the like; and any combination thereof. In some embodiments, the fines resistance tests described herein identifies fines retained by the proppant aggregate(s) in the API RP19C testing cell that are smaller than the proppant aggregate and larger than a unit mesh particle size of 10 µm. In some embodiments, the binding agent is dry coated or wet coated onto the proppant particulates. When the binding agent is dry coated, the dry coated proppant particulates may be dispersed into an aqueous fluid, and the aqueous fluid decanted from the dry coated proppant particulates prior to packing them into the testing cell.

In some embodiments, the proppant aggregates described herein exhibit an fines resistance of at least about 1%, or at least about 20%, or at least about 40%, or at least about 60%, or at least about 80%, or at least about 100%, or about 81%, or about 82%, or about 83%, or about 84%, or about 85%, or about 86%, or about 87%, or about 88%, or about 89%, or about 90% or about 91%, or about 92%, or about 93%, or about 94%, or about 95%, or about 96%, or about 97%, about 98%, or about 99%, or about 100%, or 100% in the presence of a channel upon exposure to aggregate operational conditions. Each of these values is critical to the embodiments and depend on a number of factors including, but not limited to, the type of binding agent selected, the proppant particulates selected, the aggregate operational conditions, the size and number of channel(s) in the API RP19C testing cell, and the like, and any combination thereof.

The fines retention characteristics of the proppant aggregates may additionally be tested upon application of one or more cyclic loads, where it is anticipated that certain cyclic loads will be encountered in a subterranean formation. In such cases, the fines retention characteristics of the proppant aggregates are sustained upon application of the one or more cyclic loads, such that they retain the desired performance described herein when exposed to said cyclic loads in a formation. When applied, the number of cyclic loads may be 1, 2, 3, 4, 5, 6, 7, 8, 9, 0, 11, 12, 13, 14, 15, 16, 17, 18, 19, 20, 21, 22, 23, 24, 25, 26, 27, 28, 29, or 30 cyclic load(s) for determining the fines retention (or crush resistance and fines retention determined thereafter). Each of these values is critical to the embodiments of the present disclosure and depend on a number of factors including, but not limited to, the initial aggregate operational conditions closure stress, the cyclic stress expected to be encountered in the subterranean formation, and the like, and any combination thereof.

As a specific example, the proppant aggregate(s) exhibit a fines retention of greater than about 1% in the presence of a channel upon exposure to aggregate operational conditions, where the channel occupies no more than about 1% of the cross-sectional area of the testing cell and the proppant aggregate(s) occupies at least about 99% of the cross-sectional area of the testing cell.

The proppant aggregates of the present disclosure further exhibit an unconfined compressive strength of at least about 100 psi upon exposure to aggregate operational conditions. As used herein, the term "unconfined compressive strength" refers to the stress that causes breakage of a substance (e.g., a proppant aggregate) when only under uniaxial strength. The unconfined compressive strength may be achieved where the proppant aggregates have a dimension of a diameter to height ratio (diameter:height) of 1:2 or 1:1.5 (e.g., a cylindrical or other shaped proppant aggregate of about 1 inch in diameter (1 inch=2.54 centimeters) and 2 inches tall). Such a shape and size for the proppant aggregates may be used in any embodiments described herein, without departing from the scope of the present disclosure.

The strength of the proppant aggregates described herein may be further tested and have certain characteristic requirements, as described below. Such strength characteristics include at least the unconfined compressive strength of the proppant aggregates, the tensile strength under uniaxial stress of the proppant aggregates, and the transversal strength under uniaxial strength of the proppant aggregates. The present disclosure provides methods of testing such proppant aggregates to ensure that they meet the necessary specifications for use as proppant aggregates in a subterranean formation. In one embodiment, the strength of the proppant aggregates are tested by dry coating a binding agent onto a proppant particulate as described herein (i.e., a "subpar" proppant aggregate), dispersing the dry coated proppant particulates into an aqueous base fluid, and thereafter decanting the aqueous base fluid from the dry coated proppant particulates. The dry coated proppant particulates are then packed into a curing cell, which may be substantially similar or the same as the testing cells described above with reference to API RP19C and 19D, where the binding agent is cured at an operational conditions temperature as described above, thereby forming a proppant aggregate. The proppant aggregate is removed from the curing chamber and either immediately measured for strength or cut into a desired core size, which desirably mimics the size of the proppant aggregate for use in a subterranean formation operation. The strength may additionally be measured by determining the reduction in the height of the proppant aggregates as formed or cut into cores or by measuring an increase in diameter thereof.

In some embodiments, the proppant aggregates exhibit an unconfined compressive strength in the range of about 100 psi to about 20000 psi upon exposure to aggregate operational conditions, encompassing any value and subset therebetween. For example, the proppant aggregates may exhibit an unconfined compressive strength of about 100 psi to about 500 psi, or about 500 psi to about 1000 psi, or about 1000 psi to about 2000 psi, or about 2000 psi to about 4000 psi, or about 4000 psi to about 8000 psi, or about 8000 psi to about 12000 psi, or about 12000 psi to about 16000 psi, or about 16000 psi to about 20000 psi, or about 2000 psi to about 18000 psi, or about 4000 psi to about 16000 psi, or about 6000 psi to about 14000 psi, or about 8000 psi to about 12000 psi upon exposure to aggregate operational conditions, encompassing any value and subset therebetween. Each of these values is critical to the embodiments of the present disclosure and depend on a number of factors including, but not limited to, the proppant particulates selected, the binding agent selected, the amount of binding agent used, the aggregate operational conditions, and the like, and any combination thereof.

The proppant aggregates described herein have a compression deformation of less than about 50% while under a uniaxial stress in the range of 50 psi to 2000000 psi. In some embodiments, the proppant aggregates exhibit a compression deformation in the range of about 0.1% to about 50%, such as about 0.1% to about 1%, or about 1% to about 10%, or about 10% to about 20%, or about 20% to about 30%, or about 30% to about 40%, or about 40% to about 50%, or about 10% to about 40%, or about 20% to about 30% under a uniaxial stress in the range of 50 psi to 2000000 psi, encompassing any value and subset therebetween. Accordingly, the uniaxial stress may be from about 50 psi to about 500 psi, or about 500 psi to about 2000 psi to about 10000 psi, or about 10000 psi to about 100000 psi, or about 100000 psi to about 250000 psi, or about 250000 psi to about 500000 psi, or about 500000 psi to about 750000 psi, or about 750000 psi to about 1000000 psi, or about 1000000 psi to about 1250000 psi, or about 1250000 psi to about 1500000 psi, or about 1500000 psi to about 1750000 psi, or about 1750000 psi to about 2000000 psi, encompassing any value and subset therebetween. Each of the aforementioned values is critical to the embodiments of the present disclosure and depend on a number of factors including, but not limited to, the proppant particulates selected, the binding agent selected, the amount of binding agent used, and the like, and any combination thereof.

The compressive deformation under uniaxial stress of the proppant aggregates may additionally be tested upon application of one or more cyclic loads, where it is anticipated that certain cyclic loads will be encountered in a subterranean formation. It is to be understood that in this case, the initial cyclic load is not the aggregate operational conditions closure stress load, but one of the uniaxial stress loads described above for determining the compressive deformation of the proppant aggregates, followed by a second load that is above or below the initial load, and finally returning to the initial load. In such cases, the compressive deformation characteristics of the proppant aggregates are sustained upon application of the one or more cyclic loads, such that they retain the desired performance described herein when exposed to said cyclic loads in a formation. When applied, the number of cyclic loads may be 1, 2, 3, 4, 5, 6, 7, 8, 9, 0, 11, 12, 13, 14, 15, 16, 17, 18, 19, 20, 21, 22, 23, 24, 25, 26, 27, 28, 29, or 30 cyclic load(s) for determining the compressive deformation. Each of these values is critical to the embodiments of the present disclosure and depend on a number of factors including, but not limited to, the initial uniaxial stress load, the cyclic stress expected to be encountered in the subterranean formation, and the like, and any combination thereof.

The proppant aggregates described herein have a transversal deformation of less than about 50% while under a uniaxial stress in the range of 50 psi to 2000000 psi. In some embodiments, the proppant aggregates exhibit a transversal deformation in the range of about 0.1% to about 50%, such as about 0.1% to about 1%, or about 1% to about 10%, or about 10% to about 20%, or about 20% to about 30%, or about 30% to about 40%, or about 40% to about 50%, or about 10% to about 40%, or about 20% to about 30% under a uniaxial stress in the range of 50 psi to 2000000 psi, encompassing any value and subset therebetween. Accordingly, the uniaxial stress may be from about 50 psi to about 500 psi, or about 500 psi to about 2000 psi to about 10000 psi, or about 10000 psi to about 100000 psi, or about 100000 psi to about 250000 psi, or about 250000 psi to about 500000 psi, or about 500000 psi to about 750000 psi, or about 750000 psi to about 1000000 psi, or about 1000000 psi to about 1250000 psi, or about 1250000 psi to about 1500000 psi, or about 1500000 psi to about 1750000 psi, or about 1750000 psi to about 2000000 psi, encompassing any value and subset therebetween. Each of the aforementioned values is critical to the embodiments of the present disclosure and depend on a number of factors including, but not limited to, the proppant particulates selected, the binding agent selected, the amount of binding agent used, and the like, and any combination thereof.

The transversal deformation under uniaxial stress of the proppant aggregates may additionally be tested upon application of one or more cyclic loads, where it is anticipated that certain cyclic loads will be encountered in a subterranean formation. It is to be understood that in this case, the initial cyclic load is not the aggregate operational conditions closure stress load, but one of the uniaxial stress loads described above for determining the transversal deformation of the proppant aggregates, followed by a second load that is above or below the initial load, and finally returning to the initial load. In such cases, the transversal deformation characteristics of the proppant aggregates are sustained upon application of the one or more cyclic loads, such that they retain the desired performance described herein when exposed to said cyclic loads in a formation. When applied, the number of cyclic loads may be 1, 2, 3, 4, 5, 6, 7, 8, 9, 0, 11, 12, 13, 14, 15, 16, 17, 18, 19, 20, 21, 22, 23, 24, 25, 26, 27, 28, 29, or 30 cyclic load(s) for determining the transversal deformation. Each of these values is critical to the embodiments of the present disclosure and depend on a number of factors including, but not limited to, the initial uniaxial stress load, the cyclic stress expected to be encountered in the subterranean formation, and the like, and any combination thereof.

The size of the proppant particulates can be used to further enhance the performance of the proppant aggregates of the present disclosure. For example, single sizes or combination of sizes may be used to manipulate the characteristics of the proppant aggregates (e.g., mechanical strength, closure stress resistance, deformation, and the like). In some embodiments, the proppant particulates of the present disclosure have a mean unit mesh particle size of less than about 3000 micrometers ($\mu m$) when exposed to particulate operational conditions. As used herein, the term "mean" with reference to unit mesh particle size refers to a calculated average size. As used herein, the term "unit mesh particle size" or simply "unit mesh size" refers to a size of an object (e.g., a proppant particulate) that is able to pass through a square area having each side thereof equal to a specified numerical value (e.g., less than about 300 $\mu m$). An example of unit mesh particle size is the American Society for Testing and Materials (ASTM) Designation: E11. In other embodiments, the proppant particulates have a mean unit mesh size of less than about 3000 $\mu m$ prior to exposure to the particulate operational conditions, such that they have at least not been exposed to closure stress or such that they have not been exposed to either closure stress or operational condition temperatures, encompassing any value and subset therebetween. In yet other embodiments, the proppant particulates have a mean unit mesh size of less than about 3000 $\mu m$ upon exposure to cyclic stress, encompassing any value and subset therebetween.

In some embodiments, the proppant particulates have a mean unit mesh particle size of about 1 $\mu m$ to about 3000 $\mu m$ before or after exposure to particulate operational conditions and any cyclic stress, encompassing any value and subset therebetween. For example, the proppant particulates may have a mean unit mesh particle size of about 1 $\mu m$ to about 50 $\mu m$, or about 50 $\mu m$ to about 100 $\mu m$, or about 100 $\mu m$ to about 200 $\mu m$, or about 200 $\mu m$ to about 760 $\mu m$, or about 760 $\mu m$ to about 1320 $\mu m$, or about 1320 $\mu m$ to about 1880 $\mu m$, or about 1880 $\mu m$ to about 2440 $\mu m$, or about 2440 $\mu m$ to about 3000 $\mu m$, or about 600 $\mu m$ to about 2500 $\mu m$, or about 1100 $\mu m$ to about 2000 $\mu m$ before or after exposure to particulate operational conditions or any cyclic stress, encompassing any value and subset therebetween. Each of these values is critical to the embodiments of the present disclosure and depends on a number of factors including, but not limited to, the crush resistance of the proppant particulates, the particulate operational conditions, whether the proppant particulates have been exposed to the particulate operational conditions, whether the proppant particulates have been exposed to cyclic stress, the size distribution of the proppant particulates as described below, the other characteristics of the proppant particulates as described herein, and the like, and any combination thereof.

In some embodiments, the proppant particulates described herein have particular "particle size distributions" (PSD), defined as a percentage of the proppant particulates that fall into a certain unit mesh size range. The percentage is represented as $D_X$, where X is the percentage. For example, $D_{50}$ represents the mean unit mesh particle size of the proppant particulates, as described above, which is the value of the unit mesh particle size at 50% in the cumulative PSD. As another example, $D_{95}$ is the unit mesh particle size value where 95% of the proppant particulates are smaller than such value, and $D_5$ is the unit mesh particle size value where 5% of the proppant particulates are smaller than such value. In other embodiments, the proppant particulates described herein have a particular "particle size distribution width" (PSD width), defined as the difference between the $D_{95}$ and the $D_5$ unit mesh particle size value.

In some embodiments, the proppant particulates have a PSD such that the $D_{95}$ and the $D_5$ both have a unit mesh particle size value in the range of about 1 µm to about 3000 µm when exposed to particulate operational conditions, encompassing any value and subset therebetween. In other embodiments, the proppant particulates have a PSD such that the $D_{95}$ and the $D_5$ both have a unit mesh particle size value in the range of about 1 µm to about 3000 µm prior to exposure to the particulate operational conditions, or such that they have not been exposed to either closure stress or operational condition temperatures, encompassing any value and subset therebetween. In still other embodiments, the proppant particulates have a PSD such that the $D_{95}$ and the $D_5$ both have a unit mesh particle size value in the range of about 1 µm to about 3000 µm upon exposure to cyclic stress, encompassing any value and subset therebetween.

For example, the proppant particulates may have PSD such that the $D_{95}$ and the $D_5$ both have a unit mesh particle size value of about 1 µm to about 50 µm, or about 50 µm to about 100 µm, or about 100 µm to about 200 µm, or about 200 µm to about 760 µm, or about 760 µm to about 1320 µm, or about 1320 µm to about 1880 µm, or about 1880 µm to about 2440 µm, or about 2440 µm to about 3000 µm, or about 600 µm to about 2500 µm, or about 1100 µm to about 2000 µm before or after exposure to particulate operational conditions or any cyclic stress, encompassing any value and subset therebetween. Each of these values is critical to the embodiments of the present disclosure and depends on a number of factors including, but not limited to, the crush resistance of the proppant particulates, the particulate operational conditions, whether the proppant particulates have been exposed to the particulate operational conditions, whether the proppant particulates have been exposed to cyclic stress, the size distribution of the proppant particulates as described below, the other characteristics of the proppant particulates as described herein, and the like, and any combination thereof.

The PSD of the proppant particulates used to form the proppant aggregates of the present disclosure may be such that two primary regions exist and an intermediate region exists between the primary regions. In such embodiments, the PSD regions each consist of a quantity (and size as described above) of proppant particulates, where the quantity of proppant particulates in the intermediate region is less than the average (or mean) quantity of the proppant particulates in the two combined primary regions. In some embodiments, the quantity of proppant particulates in the intermediate region is less than about 50% of the average quantity of the two combined primary regions. In other embodiments, the quantity of proppant particulates in the intermediate region is in the range of about 5% to about 50% of the average quantity of the two combined primary regions, encompassing any value and subset therebetween. For example, the quantity of proppant particulates in the intermediate region may be about 5% to about 10%, or about 10% to about 20%, or about 20% to about 30%, or about 30% to about 40%, or about 40% to about 50%, or about 5% to about 45%, or about 10% to about 40%, or about 15% to about 35%, or about 20% to about 30% of the average quantity of the two combined primary regions, encompassing any value and subset therebetween, encompassing any value and subset therebetween. Each of these values is critical to the embodiments of the present disclosure and depends on a number of factors including, but not limited to, the desired interstitial spaces between adjacent proppant particulates, the characteristics of the proppant particulates as described herein, the particulate operational conditions, and the like, and any combination thereof.

In some embodiments, the proppant particulates used to form the proppant aggregates described herein have a PSD width of greater than a unit mesh particle size of about 50 µm when exposed to particulate operational conditions. In other embodiments, the proppant particulates have a PSD width of greater than a unit mesh particle size of about 50 µm prior to exposure to the particulate operational conditions, or such that they have not been exposed to either closure stress or operational condition temperatures, encompassing any value and subset therebetween. In yet other embodiments, the proppant particulates have a PSD width of greater than a unit mesh particle size of about 50 µm when exposed to cyclic stress.

In some embodiments, the proppant particulates have a PSD width of a unit mesh particle size of from about 50 µm to about 2000 µm before or after exposure to particulate operational conditions or any cyclic stress, encompassing any value and subset therebetween. For example, the proppant particulates may have a PSD width of a unit mesh particle size of about 50 µm to about 200 µm, or about 200 µm to about 400 µm, or about 400 µm to about 600 µm, or about 600 µm to about 800 µm, or about 800 µm to about 1000 µm, or about 1000 µm to about 1200 µm, or about 1200 µm to about 1400 µm, or about 1400 µm to about 1600 µm, or about 1600 µm to about 1800 µm, or about 1800 µm to about 2000 µm, or about 200 µm to about 1800 µm, or about 400 µm to about 1600 µm, or about 600 µm to about 1400 µm, or about 800 µm to about 1200 µm before or after exposure to particulate operational conditions or any cyclic stress, encompassing any value and subset therebetween. Each of these values is critical to the embodiments of the present disclosure and depends on a number of factors including, but not limited to, the crush resistance of the proppant particulates, the particulate operational conditions, whether the proppant particulates have been exposed to the particulate operational conditions, whether the proppant particulates have been exposed to cyclic stress, the size distribution of the proppant particulates as described below, the other characteristics of the proppant particulates as described herein, and the like, and any combination thereof.

Each of the above proppant particulate mean unit mesh particle size(s), PSD(s), and PSD width(s) may be before or after exposure to the binding agent for forming the proppant aggregates described herein, without departing from the scope of the present disclosure. The presence of the binding agent may increase the size of individual proppant particulates (e.g., by wholly or partially coating a layer thereon), whereas exposure to one or both particulate operational conditions of closure stress or closure stress and downhole temperature or exposure to cyclic stress changes in closure stress can each cause the size of the proppant particulates to decrease (e.g., by crushing or deforming). Moreover, abrasion and other stresses, such as those encountered during pumping the proppant particulates to a downhole location may result in a reduction in size.

Accordingly, upon exposure to the operational condition(s), cyclic stress, and/or pumping stresses, the proppant particulates may dramatically change in unit mesh particle size, such that their mean unit mesh particle size (or $D_{50}$) is reduced by greater than about 5% per hour upon being introduced into a subterranean formation compared to prior to their introduction. In some embodiments, upon exposure to the operational condition(s), cyclic stress, and/or pumping stresses, the proppant particulates may change in unit mesh particle size, such that their mean unit mesh particle size (or $D_{50}$) is reduced by about 5% to about 50% per hour upon being introduced into a subterranean formation as compared to prior to their introduction, encompassing any value and subset therebetween. For example, the unit mesh particle size may be reduced by 5% to about 10%, or about 10% to about 20%, or about 20% to about 30%, or about 30% to about 40%, or about 40% to about 50%, or about 5% to about 45%, or about 10% to about 40%, or about 15% to about 35%, or about 20% to about 30% per hour upon being introduced into a subterranean formation as compared to prior to their introduction upon exposure to the operational condition(s), cyclic stress, and/or pumping stresses, the proppant particulates may change in unit mesh particle size, encompassing any value and subset therebetween. Each of these values is critical to the embodiments of the present disclosure and depend on a number of factors including, but not limited to, the stresses encountered by the proppant particulates (e.g., particulate operational conditions, pumping stress, cyclic stress), the crush resistance of the proppant particulates, the other characteristics of the proppant particulates as described herein, and the like, and any combination thereof. Despite this proppant particulate size reduction, the proppant aggregates formed from the proppant particulates remain sufficiently able to prop open fractures at particulate operational conditions, at least due to the particular characteristics of the proppant particulates described herein.

The shape of the proppant aggregates may be any shape formed upon agglomeration of the individual proppant particulates. For example, the proppant aggregates may be substantially spherical or otherwise polygonal (e.g., cuboid, pyramidal, and the like) in shape. As used herein, the term "substantially spherical" refers to a material that has a morphology that includes spherical geometry and elliptic geometry, including oblong spheres, ovoids, ellipsoids, capsules, platelets, and the like and may have surface irregularities. In some embodiments, the proppant aggregates have an aspect ratio of greater than about 3, to an unlimited upper limit, provided that they additionally have the unit mesh particle size described herein. The "aspect ratio" is the ratio of the larger dimension to the smaller dimension.

The individual proppant particulates of the present disclosure when packed together in the absence of the binding agent exhibit a porosity, which is altered at least partially upon application or exposure to the binding agent. As used herein, the term "porosity" refers to an amount or volume of void space of a packed proppant particulates (either in the absence or presence of the binding agent) that can contain a fluid. The presence of the binding agent generally decreases the porosity of the packed proppant particulates in the absence of the binding agent, as it coats into pore spaces on at least the surface of the proppant particulates.

In some embodiments, the porosity of the packed together proppant particulates in the absence of the binding agent exhibit a porosity of less than about 45% when exposed to particulate operational conditions. In other embodiments, the porosity of the packed together proppant particulates is less than about 45% prior to exposure to the particulate operational conditions, or such that they have not been exposed to either closure stress or operational condition temperatures, encompassing any value and subset therebetween. In still other embodiments, the porosity of the packed together proppant particulates is less than about 45% when exposed to cyclic stress. It will be appreciated that the influence of such condition(s) and/or cyclic stress will have similar effects upon the porosity of the packed proppant particulates as discussed above with reference to the crush resistance and size of the proppant particulates.

As described above, the packed together proppant particulates in the absence of the binding agent exhibit a porosity of less than about 45%, with a lower limit of 0% before or after exposure to operational conditions or any cyclic stress. Accordingly, in some embodiments, the packed together proppant particulates in the absence of the binding agent have a porosity of less than about 45%, or less than about 40%, or less than about 35%, or less than about 30%, or less than about 25%, or less than about 20%, or less than about 15%, or less than about 10%, or less than about 5%, or less than about 1%, or 0% before or after exposure to particulate operational conditions or any cyclic stress, encompassing any value and subset therebetween. Each of these values is critical to the embodiments of the present disclosure and depend on a number of factors including, but not limited to, the size (including PSD and/or PSD width) of the proppant particulates, the material forming the proppant particulates, the particulate operational conditions, whether the proppant particulates have been exposed to the particulate operational conditions, whether the proppant particulates have been exposed to cyclic stress, the other characteristics of the proppant particulates as described herein, and the like, and any combination thereof.

The proppant aggregates of the present disclosure are composed of a plurality of proppant aggregates and a binding agent, and thus generally exhibit a reduced porosity as compared to the individual proppant particulates. Generally, the proppant aggregates described herein have a porosity range of from about 0.5% to about 45% before or after exposure to aggregate operational conditions and any cyclic stress, encompassing any value and subset therebetween. For example, the proppant aggregates may have a porosity range of about 0.5% to about 1%, or about 5% to about 10%, or about 10% to about 15%, or about 15% to about 20%, or about 20% to about 25%, or about 25% to about 30%, or about 30% to about 35%, or about 35% to about 40%, or about 40% to about 45%, or about 5% to about 40%, or about 10% to about 35%, or about 15% to about 30%, or about 20% to about 25%, before or after exposure to aggregate operational conditions and any cyclic stress, encompassing any value and subset therebetween. Each of these values is critical to the embodiments of the present disclosure and depend on a number of factors including, but not limited to, the concentration and type of binding agent, the size (including PSD and/or PSD width) of the proppant particulates, the material forming the proppant particulates, the aggregate operational conditions, whether the proppant aggregates have been exposed to the aggregate operational conditions, whether the proppant aggregates have been exposed to cyclic stress, the other characteristics of the proppant particulates as described herein, and the like, and any combination thereof.

Similar to the other characteristics described herein, the sphericity and roundness of the proppant particulates for forming the proppant aggregates of the present disclosure is opposite to that of ISO 13503. Indeed, the sphericity and roundness of the proppant aggregates may be such that they depart from the shape of a sphere and have relatively shape curvatures. As used herein, the term "sphericity" is a measure of how close a proppant particulate approaches the shape of a sphere and the term "roundness" is a measure of the relative sharpness of corners or of curvature. Each are measured according to API RP19C (1$^{st}$ ed., May 2008), as referenced above, using the Krumbien Scale. The proppant particulates of the present disclosure have a sphericity and roundness of less than about 0.9 prior to the application of the binding agent and prior to application of operational conditions, or such that they have not been exposed to either closure stress or particulate operational condition temperatures. This characteristic of the present disclosure allows a wider range of particulates to be selected as the proppant particulates, thus increasing availability and decreasing costs.

As described above, the proppant particulates for forming the proppant aggregates of the present disclosure have a sphericity and roundness as measured by API RP19C of less than about 0.9, including a lower limit of 0. Accordingly, in some embodiments, the proppant particulates have a sphericity and roundness as measured by API RP19C of less than about 0.9, or less than about 0.8, or less than about 0.7, or less than about 0.6, or less than about 0.5, or less than about 0.5, or less than about 0.4, or less than about 0.3, or less than about 0.2, or less than about 0.1, or 0, encompassing any value and subset therebetween. Each of these values is critical to the embodiments of the present disclosure and depend on a number of factors including, but not limited to, the type of proppant particulates selected, the particulate operational conditions to be encountered, the crush resistance of the proppant particulates, the other characteristics of the proppant particulates as described herein, and the like, and any combination thereof.

In other embodiments, at least two categories of proppant particulates in terms of sphericity and roundness are selected for forming the proppant aggregates described herein, such that the first category has a sphericity and roundness as measured by API RP19C prior to application of the binding agent of less than about 0.9 (and any range described above) and the second category has a sphericity and roundness as measured by API RP19C prior to application of the binding agent that differs by at least 0.1 compared to the first category.

When the proppant particulates are coated with a binding agent, their roundness and sphericity is altered due to the whole or partial coating of the binding agent about the outer surface of the proppant particulates. The proppant particulates, upon application (coating) of the binding agent experience an increase in roundness and/or sphericity of about 0.1 or greater. For example, the proppant particulates may have a roundness of 0.5 and upon application of the binding agent, the roundness is increased to about 0.6, about 0.7, about 0.8, or about 0.9. Similarly, the proppant particulates may have a sphericity of 0.8 and upon application of the binding agent, the sphericity is increased to about 0.9. It is to be understood that the roundness and sphericity may increase identically (i.e., by the same amount) upon application of the binding agent or differently (e.g., one increases by more) upon application of the binding agent, without departing from the scope of the present disclosure.

As previously described, the embodiments of the present disclosure permit the use of previously deemed "subpar" particulates for proppant, thus enabling consumption (including local consumption) of a wide variety of low cost materials for use in generating a highly conductive fracture that have heretofore been dismissed for use in fracturing operations. Examples of materials for use as the proppant particulates of the present disclosure include any material capable of meeting one or more of the characteristics described herein for use in a fracturing operation. Such material include sand, bauxite, ceramic materials, glass materials, polymer materials (e.g., polystyrene, polyethylene, etc.), nut shell pieces, seed shell pieces, fruit pit pieces, wood, cements (e.g., Portland cements), fly ash, carbon black powder, silica, alumina, alumino-silicates, fumed carbon, carbon black, graphite, mica, titanium dioxide, barite, meta-silicate, calcium silicate, calcium carbonate, dolomite, nepheline syenite, feldspar, pumice, volcanic material, kaolin, talc, zirconia, boron, shale, clay, sandstone, mineral carbonates, mineral oxide, iron oxide, formation minerals, waste stream sources, man-made materials, low-quality manufactured materials, any of the aforementioned mixed with a resin to form cured resinous particulates, and any combination thereof. It is to be understood that although such materials have been used as proppant particulates in the past, they have not met the required one or more characteristics of the proppant particulates of the present disclosure. For example, the mechanical strength of the same material will differ depending on whether the proppant particulates are more or less porous compared to one another, which will influence crush resistance, as well.

In some embodiments, local sand is a preferred material for forming the proppant particulates of the present disclosure. As used herein, the term "local sand" refers to locally available solid material that originates from surface sources, or from subsurface sources such as mine. Local sand may be preferred, as it is readily obtainable and is typically inexpensive because it is not traditionally used as proppant particulates in fracturing operations. Examples of commercially available local sand include, but are not limited to, sand available from Adwan Chemical Industries Co. Ltd. in Saudi Arabia, and sand available from Delmon Co. Ltd. in Saudi Arabia. Other commercially available types of sand include, but are not limited, to Brady Brown sand and Northern White sand types.

Table 1 below demonstrates the difference in various characteristics as measured using API 19C of the commercially available local sand as compared to traditional ISO 13503 commercially available proppant particulates and Table 2 indicates the crush resistance as measured by API 19C of the commercially available local sand as compared to traditional ISO 13503 commercially available proppant particulates. The traditional ISO 13503 commercially available proppant particulates are CARBOHSP high-density sintered bauxite proppant available from CARBO Ceramics Inc. in Houston, Tex. Of particular interest in Table 1 is the vast difference in roundness, sphericity, and in Table 2 of the vast difference in high psi fines generation in crush resistance testing. The sand numbers (e.g., 20/40, 16/30, 30/50) indicate low and high sieve values based on U.S. Standard Sieve Series. The units "gm/cc" are grams per milliliter, "FTU" is the Fomazin Turbiditiy Unit. Table 2 lists the % of fines generated upon application of a particular closure stress. Where the symbol "--" is shown, the API RP19C measurement is not provided.

TABLE 1

| Particulate Type | Specific Gravity | Bulk Density (gm/cc) | Acid Solubility (%) | Turbiditiy (FTU) | Sphericity | Roundness |
|---|---|---|---|---|---|---|
| Adwan 20/40 sand | 2.64 | — | 3.76 | 65 | 0.64 | 0.7 |
| Delmon 20/40 sand | 2.63 | 1.53 | 0.55 | 20 | 0.72 | 0.71 |
| Northern White 20/40 sand | 2.65 | 1.53 | 0.6-0.7 | 45-70 | 0.7-0.9 | 0.7-0.9 |
| Brown 20/40 sand | 2.65 | 1.54 | 0.9 | 48 | 0.64 | 0.62 |
| Adwan 16/30 sand | — | 1.58 | 2.22 | 10 | 0.77 | 0.66 |
| Delmon 16/30 sand | — | 1.6 | 1.11 | 15 | 0.73 | 0.6 |
| Delmon 30/50 sand | — | 1.51 | 0.55 | 21 | 0.65 | 0.68 |
| CARBOHSP proppant | 3.61 | 2.1 | 2.5 | — | 0.9 | 0.9 |

TABLE 2

| Particulate Type | Crush (1000 psi) | Crush (2000 psi) | Crush (3000 psi) | Crush (4000 psi) | Crush (5000 psi) | Crush (6000 psi) |
|---|---|---|---|---|---|---|
| Adwan 20/40 Sand | — | 1.3% | — | 10.5% | — | 24.5% |
| Delmon 20/40 Sand | 0.3% | 1.3% | 5.4% | 17.1% | — | — |
| Northern White 20/40 Sand | — | 0.7% | — | 1.6% | 2.6% | — |
| Brown 20/40 Sand | — | 0.7% | 2.0% | 6.7% | — | — |
| Adwan 16/30 sand | — | 3.3% | — | 22.9% | — | 37.0% |
| Delmon 16/30 sand | — | 4.7% | — | 26.1% | — | 39.4% |
| Delmon 30/50 sand | 0.5% | 1.2% | 3.6% | 6.7% | 15.7% | — |
| CARBOHSP proppant | — | — | — | — | — | 0.1% |

The embodiments herein provide a method of introducing the proppant aggregates of the present disclosure to a downhole location. In particular, the proppant aggregates are introduced into a subterranean formation and placed into at least one fracture in the subterranean formation, followed by removing hydraulic pressure from the formation to expose the proppant aggregates to operational conditions, as defined above. The proppant aggregates comprise proppant particulates and a binding agent and may be formed on-the-fly by combining the proppant particulates and the binding agent as they are introduced into the formation. As used herein, the term "on-the-fly" refers to performing an operation during a subterranean treatment that does not require stopping normal operations. The proppant aggregates may be introduced into the subterranean formation in a treatment fluid comprising a base fluid, which may be an aqueous base fluid, an oil base fluid, an aqueous-miscible (i.e., having an alcohol) base fluid, an oil-in-water emulsion, or a water-in-oil emulsion.

Moreover, the treatment fluid may additionally comprise one or more additives for enhancing the fracturing operation, enhancing the treatment fluid itself, enhancing the ability of the proppant aggregates to form or remain in suspension, and the like. Examples of suitable additives may include, but are not limited to, a salt, a weighting agent, an inert solid, an emulsifier, a dispersion aid, a corrosion inhibitor, an emulsion thinner, an emulsion thickener, a surfactant, a lost circulation material, a foaming agent, a gas, a pH control additive, a breaker, a biocide, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids comprising proppant aggregates described herein to a downhole location are described, such as during a hydraulic fracturing operation. In various embodiments, the systems can comprise a pump fluidly coupled to a tubular, the tubular containing a treatment fluid comprising the proppant aggregates, referred to below simply as "treatment fluid."

The pump may be a high-pressure pump in some embodiments. As used herein, the term "high pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some embodiments, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps.

In other embodiments, the pump may be a low-pressure pump. As used herein, the term "low pressure pump" will refer to a pump that operates at a pressure of about 1000 psi or less. In some embodiments, a low-pressure pump may be fluidly coupled to a high-pressure pump that is fluidly coupled to the tubular. That is, in such embodiments, the low-pressure pump may be configured to convey the treatment fluid to the high-pressure pump. In such embodiments, the low-pressure pump may "step up" the pressure of the treatment fluid before it reaches the high-pressure pump.

In some embodiments, the systems described herein can further comprise a mixing tank that is upstream of the pump and in which the treatment fluid is formulated. In various embodiments, the pump (e.g., a low-pressure pump, a high-pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may be recovered and used in a different subterranean formation, a different operation, or a different industrial application.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A method comprising: forming a proppant aggregate comprising proppant particulates and a binding agent, wherein the proppant aggregate exhibits a conductivity of less than about 3000 millidarcy-feet when exposed to aggregate operational conditions, the aggregate operational conditions having a closure stress of at least about 100 pounds per square inch and a temperature of at least about 10° C., and wherein the conductivity of the proppant aggregate is determined by a conductivity test comprising: (a) coating the binding agent onto the proppant particulates, thereby forming coated proppant particulates; (b) packing the coated proppant particulates into a conductivity testing cell; (c) exposing the conductivity testing cell to the aggregate operational conditions, thereby forming the proppant aggregate; and (d) measuring the conductivity of the proppant aggregate; and placing the proppant aggregate into at least one fracture in a subterranean formation.

Embodiment B

A proppant aggregate comprising: proppant particulates and a binding agent, wherein the proppant aggregate exhibits a conductivity of less than about 3000 millidarcy-feet when exposed to aggregate operational conditions, the aggregate operational conditions having a closure stress of at least about 100 pounds per square inch and a temperature of at least about 10° C.

Embodiment C

A method comprising: introducing proppant aggregates into a subterranean formation, the proppant aggregates comprising proppant particulates and a binding agent, wherein the proppant aggregate exhibits a conductivity of less than about 3000 millidarcy-feet when exposed to aggregate operational conditions, the aggregate operational conditions having a closure stress of at least about 100 pounds per square inch and a temperature of at least about 10° C.; placing the proppant aggregates into at least one fracture in a subterranean formation; and removing hydraulic pressure from the subterranean formation, thereby exposing the proppant aggregates to the aggregate operational conditions in the fracture.

Embodiments A, B, and C may have one or more of the following additional elements in any combination:

Element 1: A method comprising: forming a proppant aggregate comprising proppant particulates and a binding agent, wherein the proppant aggregate exhibits a conductivity of less than about 3000 millidarcy-feet when exposed to aggregate operational conditions, the aggregate operational conditions having a closure stress of at least about 100 pounds per square inch and a temperature of at least about 10° C., and wherein the conductivity of the proppant aggregate is determined by a conductivity test comprising: (a) coating the binding agent onto the proppant particulates, thereby forming coated proppant particulates; (b) packing the coated proppant particulates into a conductivity testing cell; (c) exposing the conductivity testing cell to the aggregate operational conditions, thereby forming the proppant aggregate; and (d) measuring the conductivity of the proppant aggregate; and placing the proppant aggregate into at least one fracture in a subterranean formation, wherein the binding agent is dry coated onto the proppant particulates in step (a), and further comprising: (a1) dispersing the dry coated proppant particulates into an aqueous base fluid and (a2) decanting the aqueous base from the dry coated proppant particulates.

Element 2: A method comprising: forming a proppant aggregate comprising proppant particulates and a binding agent, wherein the proppant aggregate exhibits a conductivity of less than about 3000 millidarcy-feet when exposed to aggregate operational conditions, the aggregate operational conditions having a closure stress of at least about 100 pounds per square inch and a temperature of at least about 10° C., and wherein the conductivity of the proppant aggregate is determined by a conductivity test comprising: (a) coating the binding agent onto the proppant particulates, thereby forming coated proppant particulates; (b) packing the coated proppant particulates into a conductivity testing cell; (c) exposing the conductivity testing cell to the aggregate operational conditions, thereby forming the proppant aggregate; and (d) measuring the conductivity of the proppant aggregate; and placing the proppant aggregate into at least one fracture in a subterranean formation, further comprising after step (b): (c1) forming at least one channel in the conductivity testing cell, wherein in step (c) the proppant aggregate comprises between 1% and 99% of the cross-sectional area of the conductivity testing cell and the remainder forms the at least one channel.

Element 3: A method comprising: forming a proppant aggregate comprising proppant particulates and a binding agent, wherein the proppant aggregate exhibits a conductivity of less than about 3000 millidarcy-feet when exposed to aggregate operational conditions, the aggregate operational conditions having a closure stress of at least about 100 pounds per square inch and a temperature of at least about 10° C., and wherein the conductivity of the proppant aggregate is determined by a conductivity test comprising: (a) coating the binding agent onto the proppant particulates, thereby forming coated proppant particulates; (b) packing the coated proppant particulates into a conductivity testing cell; (c) exposing the conductivity testing cell to the aggregate operational conditions, thereby forming the proppant aggregate; and (d) measuring the conductivity of the proppant aggregate; and placing the proppant aggregate into at least one fracture in a subterranean formation, further comprising after step (b): (c1) forming at least one channel in the conductivity testing cell, wherein in step (c) the proppant aggregate comprises between 1% and 99% of the cross-sectional area of the conductivity testing cell and the remainder forms the at least one channel, and wherein the conductivity of the proppant aggregate differs from a conductivity of the at least one channel by at least about 100 millidarcy-feet.

Element 4: Wherein the proppant aggregate further has a conductivity sustainability of from about 1% to about 99% and a conductivity of greater than about 100 millidarcy-feet upon exposure to at least one cyclic load and when exposed to the aggregate operational conditions.

Element 5: Wherein the proppant aggregate further has a conductivity sustainability of from about 1% to about 99% and a conductivity of greater than about 100 millidarcy-feet upon exposure to at least one cyclic load and when exposed to the aggregate operational conditions, and wherein the conductivity sustainability of the proppant aggregate is determined by a conductivity sustainability test comprising: (A) coating the binding agent onto the proppant particulates, thereby forming coated proppant particulates; (B) packing the coated proppant particulates into a conductivity sustainability testing cell; (C) forming at least one channel in the conductivity sustainability testing cell; (D) exposing the conductivity sustainability testing cell to the aggregate operational conditions, thereby forming the proppant aggregate, wherein the proppant aggregate comprises between 1% and 99% of the cross-sectional area of the conductivity sustainability testing cell and the remainder forms the at least one channel; (E) performing at least on cyclic load; and (F) measuring the conductivity sustainability of the proppant aggregate.

Element 6: Wherein the proppant aggregate further has an aggregate stability of at least 80% when exposed to the aggregate operational conditions.

Element 7: A method comprising: forming a proppant aggregate comprising proppant particulates and a binding agent, wherein the proppant aggregate exhibits a conductivity of less than about 3000 millidarcy-feet when exposed to aggregate operational conditions, the aggregate operational conditions having a closure stress of at least about 100 pounds per square inch and a temperature of at least about 10° C., and wherein the conductivity of the proppant aggregate is determined by a conductivity test comprising: (a) coating the binding agent onto the proppant particulates, thereby forming coated proppant particulates; (b) packing the coated proppant particulates into a conductivity testing cell; (c) exposing the conductivity testing cell to the aggregate operational conditions, thereby forming the proppant aggregate; and (d) measuring the conductivity of the proppant aggregate; and placing the proppant aggregate into at least one fracture in a subterranean formation, wherein the proppant aggregate further has an aggregate stability of at least 20% when exposed to aggregate operational conditions, and wherein the aggregate stability is determined by an aggregate stability test further comprising: step (e) measuring the aggregate stability of the proppant aggregate in the conductivity testing cell after measuring the conductivity sustainability of the proppant aggregate.

Element 8: Wherein the proppant aggregate further has a crush resistance of less than about 90% when exposed to the aggregate operational conditions.

Element 9: wherein the proppant aggregate further has a crush resistance of less than about 90% when exposed to the aggregate operational conditions, and wherein the crush resistance of the proppant aggregate is determined by a crush resistance test comprising: (A) coating the binding agent onto the proppant particulates, thereby forming coated proppant particulates; (B) packing the coated proppant particulates into a crush resistance testing cell; (C) forming at least one channel in the crush resistance testing cell; (D) exposing the crush resistance testing cell to the aggregate operational conditions, thereby forming the proppant aggregate, wherein the proppant aggregate comprises between 1% and 99% of the cross-sectional area of the crush resistance testing cell and the remainder forms the at least one channel; and (E) measuring the crush resistance of the proppant aggregate.

Element 10: Wherein the proppant aggregate further has a crush resistance of less than about 90% and a fines retention of at least about 1% to when exposed to the aggregate operational conditions.

Element 11: wherein the proppant aggregate further has a crush resistance of less than about 90% and a fines retention of at least about 1% to when exposed to the aggregate operational conditions, and wherein the crush resistance and the fines retention of the proppant aggregate is determined by a crush resistance test comprising: (A) coating the binding agent onto the proppant particulates, thereby forming coated proppant particulates; (B) packing the coated proppant particulates into a crush resistance testing cell; (C) forming at least one channel in the crush resistance testing cell; (D) exposing the crush resistance testing cell to the aggregate operational conditions, thereby forming the proppant aggregate, wherein the proppant aggregate comprises between 1% and 99% of the cross-sectional area of the crush resistance testing cell and the remainder forms the at least one channel; (E) measuring the crush resistance of the proppant aggregate; and (F) measuring the fines retention of the proppant aggregate after measuring the crush resistance of the proppant aggregate.

Element 12: Wherein the proppant aggregate further has a fines capture of greater than about 0.1% for fine particles having a unit mesh size of less than about 1000 micrometers at aggregate operational conditions.

Element 13: wherein the proppant aggregate further has a fines capture of greater than about 0.1% for fine particles having a unit mesh size of less than about 1000 micrometers at aggregate operational conditions, and wherein the fines capture of the proppant aggregate is determined by a fines capture test comprising: (A) coating the binding agent onto the proppant particulates, thereby forming coated proppant particulates; (B) packing the coated proppant particulates into a fines capture testing cell; (C) forming at least one channel in the fines capture testing cell; (D) exposing the fines capture testing cell to the aggregate operational conditions, thereby forming the proppant aggregate, wherein the proppant aggregate comprises between 1% and 99% of the cross-sectional area of the fines capture testing cell and the remainder forms the at least one channel; (E) flowing a treatment fluid comprising fines particles having a unit mesh size of less than about 1000 micrometers at aggregate operational conditions into the fines capture testing cell; and (F) measuring the fines capture of the proppant aggregate.

By way of non-limiting example, exemplary combinations applicable to A, B, C include: 1, 2, 3, 4, 5, 6, 7, 8, 9, 10, 11, 12, and 13; 1, 3, 5, 7, 9, and 10; 2 and 6; 3, 7, 8, and 12; 11 and 13; and the like.

To facilitate a better understanding of the embodiments described herein, the following example of preferred or representative embodiments is given. In no way should the following example be read to limit, or to define, the scope of the present disclosure.

Example 1

In this example, the unconfined compressive strength of several proppant aggregates formed according to the embodiments described herein was evaluated. The proppant aggregates were formed using either Delmon 30/50 proppant particulates or Adwan 20/40 proppant particulates, each with one of 3% vol/wt EXPEDITE® binding agent, 5% vol/wt EXPEDITE® binding agent, or 7% vol/wt EXPEDITE® binding agent. The proppant particulates and binding agent were combined in a curing cell and allowed to cure at 275° F. for 24 hours into proppant aggregates in the shape of a cylinder with a height:diameter ratio of 2:1 ("cylinders"). Thereafter, the cylinders were removed from the curing cell and tested for their compressive strength with a uniaxial stress. A displacement rate of 0.001 inches per second at 275° F. was uniformly applied and the uniaxial stress at which cylinder breakage occurred was measured. The results are shown in Table 3 below and demonstrate that the proppant aggregates formed with "subpar" materials exhibit compressive strength suitable for use in propping subterranean formation fractures.

TABLE 3

| Particulate Type | 3% vol/wt EXPEDITE ® | 5% vol/wt EXPEDITE ® | 7% vol/wt EXPEDITE ® |
| --- | --- | --- | --- |
| Delmon 30/50 sand | 1364 psi | 2495 psi | 1570 psi |
| Adwan 20/40 sand | 1875 psi | 1383 psi | 1595 psi |

Example 2

In this example, the unconfined compressive strength of several proppant aggregates formed according to the embodiments described herein was evaluated and compared to a proppant aggregate formed of traditional material (CARBOHSP). The proppant aggregates were formed using either Delmon 30/50 proppant, Adwan 20/40 proppant particulates, traditional CARBOHSP 30/60 particulates, or traditional CARBOHSP 20/40 particulates, each with one of 3% vol/wt EXPEDITE® binding agent, 5% vol/wt EXPEDITE® binding agent, or 7% vol/wt EXPEDITE® binding agent. The proppant particulates and binding agent were combined in a curing cell and allowed to cure at 275° F. for 24 hours into proppant aggregates in the shape of a cylinder with a diameter:height ratio of 1:1.5 ("cylinders"). Thereafter, the cylinder were removed from the curing cell and tested for their compressive strength with a uniaxial stress. A displacement rate of 0.001 inches per second at 77° F. (room temperature) was uniformly applied and the uniaxial stress at which cylinder breakage occurred was measured. The results are shown in Table 4 below and demonstrate that the proppant aggregates formed with "subpar" materials exhibit compressive strength suitable for use in propping subterranean formation fractures and superior to the traditional particulates at all concentrations of the binding agent.

TABLE 4

| Particulate Type | 3% vol/wt EXPEDITE ® | 5% vol/wt EXPEDITE ® | 7% vol/wt EXPEDITE ® |
|---|---|---|---|
| Delmon 30/50 sand | 1955 psi | 2222 psi | 2691 psi |
| Adwan 20/40 sand | 1185 psi | 2291 psi | 2863 psi |
| CARBOHSP 30/60 proppant | 1122 psi | 2328 psi | 2833 psi |
| CARBOHSP 20/40 proppant | 607 psi | 1088 psi | 2119 psi |

Example 3

In this example, the compressive strength of several proppant aggregates formed according to the embodiments described herein was evaluated and compared to a proppant aggregate formed of traditional material (CARBOHSP) in terms of axial strain and transverse strain. Proppant aggregates were formed using either Delmon 30/50 proppant, Adwan 20/40 proppant particulates, or traditional CARBOHSP 20/40 particulates, each with 7% vol/wt EXPEDITE® binding agent. The proppant particulates and binding agent were combined in a curing cell and allowed to cure at 275° F. for 24 hours into proppant aggregates in the shape of a cylinder with a diameter:height ratio of 1:1.5 ("cylinder"). Thereafter, the cylinders were removed from the curing cell and tested for their compressive strength in terms of axial strain, and transverse strain. A displacement rate of 0.001 inches per second at 275° F. was uniformly applied and the uniaxial stress at which cylinder breakage was measured. The results are shown in Table 5 below and demonstrate that the proppant aggregates formed with "subpar" materials exhibit compressive strength suitable for use in propping subterranean formation fractures and superior to the traditional particulates at all concentrations of the binding agent.

TABLE 5

| Particulate Type | Unconfined Compressive Stress Strength | Axial Strain | Transverse Strain |
|---|---|---|---|
| Delmon 30/50 sand | 1570 psi | −0.34% | −0.22% |
| Adwan 20/40 sand | 1595 psi | −1.31% | −0.90% |
| CARBOHSP 20/40 proppant | 742 psi | −1.78% | −2.07% |

Example 4

In this example, the compressive strength in terms of deformation of several proppant aggregates formed according to the embodiments described herein was evaluated. The proppant aggregates were formed using Delmon 30/50, Adwan 20/40, or CARBOHSP 20/40, and coated with 3% vol/wt EXPEDITE® binding agent, 5% vol/wt EXPEDITE® binding agent, or 7% vol/wt EXPEDITE® binding agent. The proppant particulates and binding agent were combined in a curing cell and allowed to cure at 275° F. for 24 hours into proppant aggregates in the shape of a cylinder with a diameter:height ratio of 1:1.5 ("cylinder"). Thereafter, the cylinders were removed from the curing cell and tested for their compressive strength in terms of axial strain, and transverse strain. A displacement rate of 0.0001 inches per second at 275° F. was uniformly applied and the uniaxial stress at which cylinder breakage was measured. During the test, video recording of the cylinders allow quantification of the axial strain and transverse strain, such strains being a measure of the percent change in the height (axial) or diameter (transverse). The results are shown in Table 6 below and demonstrate that the proppant aggregates formed with "subpar" materials exhibit compressive strength suitable for use in propping subterranean formation fractures and superior to the traditional particulates at all concentrations of the binding agent.

TABLE 6

| Particulate Type | Expedite (% vol/wt) | Strain Rate (in/sec) | Unconfined Compressive Strength (psi) | Axial Strain (Video) (%) | Transverse Strain (Video) (%) |
|---|---|---|---|---|---|
| Delmon 30/50 sand | 3 | 0.00010 | 1364 | −0.50869 | −0.16283 |
| | 5 | 0.00010 | 2494 | −0.71321 | −0.24882 |
| | 7 | 0.00010 | 1570 | −0.33982 | −0.21814 |
| Adwan 20/40 sand | 3 | 0.00010 | 1874 | −0.43746 | −0.45037 |
| | 5 | 0.00010 | 1382 | −1.14436 | −1.24191 |
| | 7 | 0.00010 | 1594 | −1.35076 | −0.89505 |
| CARBOHSP 20/40 proppant | 3 | 0.00010 | 777 | −0.54614 | −0.37987 |
| | 5 | 0.00010 | 922 | −1.09252 | −1.54739 |
| | 7 | 0.00010 | 742 | −1.78330 | −2.06823 |

Therefore, the present disclosure is well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:

forming a proppant aggregate comprising proppant particulates and a binding agent, testing the proppant aggregate at aggregate operational conditions to determine conductivity, porosity, and unconfined compression strength;

wherein the conductivity of the proppant aggregate is determined by a conductivity test comprising:

(a) coating the binding agent onto the proppant particulates, thereby forming coated proppant particulates;

(b) packing the coated proppant particulates into a conductivity testing cell;

(c) exposing the conductivity testing cell to the aggregate operational conditions, thereby forming the proppant aggregate; and (d) measuring the conductivity of the proppant aggregate; and selecting the proppant aggregate having the conductivity of less than about 3000 millidarcy-feet when exposed to aggregate operational conditions, the porosity of about 0.5% to about 35% after exposure to aggregate operational conditions, and the unconfined compression strength about 100 psi to about 2,000 psi upon exposure to aggregate operational conditions, wherein the aggregate operational conditions having a closure stress of at least about 100 pounds per square inch and a temperature of at least about 10° C., and placing the selected proppant aggregate into at least one fracture in a subterranean formation.

2. The method of claim 1, wherein the binding agent is dry coated onto the proppant particulates in step (a), and further comprising: (a1) dispersing the dry coated proppant particulates into an aqueous base fluid and (a2) decanting the aqueous base from the dry coated proppant particulates.

3. The method of claim 1, further comprising after step (b): (c1) forming at least one channel in the conductivity testing cell, wherein in step (c) the proppant aggregate comprises between 1% and 99% of a cross-sectional area of the conductivity testing cell and a remainder forms the at least one channel.

4. The method of claim 1, further comprising after step (b): (c1) forming at least one channel in the conductivity testing cell, wherein in step (c) the proppant aggregate comprises between 1% and 99% of a cross-sectional area of the conductivity testing cell and a remainder forms the at least one channel, and wherein the conductivity of the proppant aggregate differs from a conductivity of the at least one channel by at least about 100 millidarcy-feet.

5. The method of claim 1, wherein the proppant aggregate further has a conductivity sustainability of from about 1% to about 99% and a conductivity of greater than about 100 millidarcy-feet upon exposure to at least one cyclic load and when exposed to the aggregate operational conditions.

6. The method of claim 1, wherein the proppant aggregate further has a conductivity sustainability of from about 1% to about 99% and a conductivity of greater than about 100 millidarcy-feet upon exposure to at least one cyclic load and when exposed to the aggregate operational conditions, and wherein the conductivity sustainability of the proppant aggregate is determined by a conductivity sustainability test comprising:

(A) coating the binding agent onto the proppant particulates, thereby forming coated proppant particulates;

(B) packing the coated proppant particulates into a conductivity sustainability testing cell;

(C) forming at least one channel in the conductivity sustainability testing cell;

(D) exposing the conductivity sustainability testing cell to the aggregate operational conditions, thereby forming the proppant aggregate, wherein the proppant aggregate comprises between 1% and 99% of a cross-sectional area of the conductivity sustainability testing cell and a remainder forms the at least one channel;

(E) performing at least on cyclic load; and (F) measuring the conductivity sustainability of the proppant aggregate.

7. The method of claim 1, wherein the proppant aggregate further has an aggregate stability of at least 80% when exposed to the aggregate operational conditions.

8. The method of claim 1, wherein the proppant aggregate further has an aggregate stability of at least 20% when exposed to aggregate operational conditions, and wherein the aggregate stability is determined by an aggregate stability test further comprising: step (e) measuring the aggregate stability of the proppant aggregate in the conductivity testing cell after measuring the conductivity sustainability of the proppant aggregate.

9. The method of claim 1, wherein the proppant aggregate further has a crush resistance of less than about 90% when exposed to the aggregate operational conditions.

10. The method of claim 1, wherein the proppant aggregate further has a crush resistance of less than about 90% when exposed to the aggregate operational conditions, and wherein the crush resistance of the proppant aggregate is determined by a crush resistance test comprising:

(A) costing the binding agent onto the proppant particulates, thereby forming coated proppant particulates;

(B) packing the coated proppant particulates into a crush resistance testing cell;

(C) forming at least one channel in the crush resistance testing cell;

(D) exposing the crush resistance testing cell to the aggregate operational conditions, thereby forming the proppant aggregate, wherein the proppant aggregate comprises between 1% and 99% of a cross-sectional area of the crush resistance testing cell and a remainder forms the at least one channel; and (E) measuring the crush resistance of the proppant aggregate.

11. The method of claim 1, wherein the proppant aggregate further has a crush resistance of less than about 90% and a fines retention of at least about 1% to when exposed to the aggregate operational conditions, and wherein the crush resistance and the fines retention of the proppant aggregate is determined by a crush resistance test comprising:

(A) coating the binding agent onto the proppant particulates, thereby forming coated proppant particulates;

(B) packing the coated proppant particulates into a crush resistance testing cell;

(C) forming at least one channel in the crush resistance testing cell;

(D) exposing the crush resistance testing cell to the aggregate operational conditions, thereby forming the proppant aggregate, wherein the proppant aggregate comprises between 1% and 99% of a cross-sectional area of the crush resistance testing cell and a remainder forms the at least one channel;
(E) measuring the crush resistance of the proppant aggregate; and
(F) measuring the fines retention of the proppant aggregate after measuring the crush resistance of the proppant aggregate.

12. The method of claim 1, wherein the proppant aggregate further has a fines capture of greater than about 0.1% for fine particles having a unit mesh size of less than about 1000 micrometers at aggregate operational conditions, and wherein the fines capture of the proppant aggregate is determined by a fines capture test comprising:
(A) costing the binding agent onto the proppant particulates, thereby forming coated proppant particulates;
(B) packing the coated proppant particulates into a fines capture testing cell;
(C) forming at least one channel in the fines capture testing cell;
(D) exposing the fines capture testing cell to the aggregate operational conditions, thereby forming the proppant aggregate,
wherein the proppant aggregate comprises between 1% and 99% of cross-sectional area of the fines capture testing cell and remainder forms the at least one channel;
(E) flowing a treatment fluid comprising fines particles having a unit mesh size of less than about 1000 micrometers at aggregate operational conditions into the fines capture testing cell; and
(F) measuring the fines capture of the proppant aggregate.

13. A proppant aggregate comprising:
proppant particulates and a binding agent,
wherein the proppant aggregate exhibits a conductivity of less than about 3000 millidarcy-feet when exposed to aggregate operational conditions,
wherein the proppant aggregate exhibits a porosity of about 0.5% to about 35% after exposure to aggregate operational conditions,
wherein the proppant aggregate exhibits an unconfined compression strength of about 100 psi to about 2,000 psi upon exposure to aggregate operational conditions, and
wherein the aggregate operational conditions having a closure stress of at least about 100 pounds per square inch and a temperature of at least about 10° C.

14. The proppant aggregate of claim 13, wherein the proppant aggregate further has a conductivity sustainability of from about 1% to about 99% and a conductivity of greater than about 100 millidarcy-feet upon exposure to at least one cyclic load and when exposed to the aggregate operational conditions.

15. The proppant aggregate of claim 13, wherein the proppant aggregate further has an aggregate stability of at least 20% when exposed to the aggregate operational conditions.

16. The proppant aggregate of claim 13, wherein the proppant aggregate further has a crush resistance of less than about 90% when exposed to the aggregate operational conditions.

17. The proppant aggregate of claim 13, wherein the proppant aggregate further has a fines capture of greater than about 0.1% for fine particles having a unit mesh size of less than about 1000 micrometers at aggregate operational conditions.

18. The proppant aggregate of claim 13, wherein the proppant aggregate further exhibits an unconfined compressive strength of t least 100 pounds per square inch at aggregate operational conditions.

19. The proppant aggregate of claim 13, wherein the proppant aggregate further exhibits at least one of a compression deformation or a transversal deformation of less than 50% under a uniaxial stress in the range of about 50 pounds per square inch to about 2000000 pounds per square inch at aggregate operational conditions.

20. A method comprising:
introducing proppant aggregates into a subterranean formation, the proppant aggregates comprising proppant particulates and a binding agent,
wherein the proppant aggregate exhibits a conductivity of less than about 3000 millidarcy-feet when exposed to aggregate operational conditions,
wherein the proppant aggregate exhibits a porosity of about 0.5% about 35% after exposure to aggregate operational conditions,
wherein the proppant aggregate exhibits an unconfined compression strength of about 100 psi to about 2,000 psi upon exposure to aggregate operational conditions, and
wherein the aggregate operational conditions having a closure stress of at least about 100 pounds per square inch and a temperature of at least about 10° C.;
placing the proppant aggregates into at least one fracture in a subterranean formation; and
removing hydraulic pressure from the subterranean formation, thereby exposing the proppant aggregates to the aggregate operational conditions in the fracture.

* * * * *

UNITED STATES PATENT AND TRADEMARK OFFICE
CERTIFICATE OF CORRECTION

PATENT NO. : 10,538,697 B2  
APPLICATION NO. : 15/759802  
DATED : January 21, 2020  
INVENTOR(S) : Philip D. Nguyen, Walter T. Stephens and Michael Wayne Sanders Page 1 of 1

It is certified that error appears in the above-identified patent and that said Letters Patent is hereby corrected as shown below:

In the Claims

Column 40, Claim 10, Line 35: Replace "costing" with "coating"

Signed and Sealed this
Tenth Day of March, 2020

Andrei Iancu
*Director of the United States Patent and Trademark Office*